US011211055B2

(12) United States Patent
McConnell

(10) Patent No.: US 11,211,055 B2
(45) Date of Patent: Dec. 28, 2021

(54) UTILIZING RULE SPECIFICITY IN CONVERSATIONAL AI

(71) Applicant: Microsoft Technology Licensing, LLC, Redmond, WA (US)

(72) Inventor: Christopher Clayton McConnell, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 138 days.

(21) Appl. No.: 16/247,479

(22) Filed: Jan. 14, 2019

(65) Prior Publication Data
US 2020/0227029 A1 Jul. 16, 2020

(51) Int. Cl.
| | | |
|---|---|---|
| *G10L 15/22* | (2006.01) | |
| *G10L 15/18* | (2013.01) | |
| *G10L 15/183* | (2013.01) | |
| G10L 15/08 | (2006.01) | |

(52) U.S. Cl.
CPC ........ *G10L 15/1815* (2013.01); *G10L 15/183* (2013.01); *G10L 15/22* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| 4,658,370 A | * | 4/1987 | Erman | .................. G06N 5/022 706/60 |
| 5,802,508 A | * | 9/1998 | Morgenstern | .......... G06N 5/027 706/55 |

(Continued)

FOREIGN PATENT DOCUMENTS

WO 8600156 A1 1/1986

OTHER PUBLICATIONS

Iqbal, et al. "Basic Features of FormFlow", Retrieved From: https://docs.microsoft.com/en-us/azure/bot-service/dotnet/bot-builder-dotnet-formflow?view=azure-bot-service-3.0, Dec. 13, 2017, 12 Pages.

(Continued)

*Primary Examiner* — Fariba Sirjani
(74) *Attorney, Agent, or Firm* — Schwegman Lundberg & Woessner, P.A.

(57) ABSTRACT

Techniques are provided for building a dialog-state specific contextual language understanding system using subsumption logic. Information establishing conversational rules identifying the conversational dialog is received to present in respective dialog states. Each rule has a Boolean trigger expression of predicates for testing the conversational state together with logical connectives to identify when the rule is applicable. Subsumption logic is used to arrange the rules into a directed acyclic graph (DAG) where more specific rules are preferred to more general rules. During a conversation, the DAG is used to filter the triggered rules to only the most specific triggered rules from which a rule to run is selected. This structure makes it easier to build conversational systems because rules can be added or removed without having to change or reason over other rules. The rules also act as a constraint to help machine learned selection systems converge with less data.

20 Claims, 12 Drawing Sheets

(56) References Cited

U.S. PATENT DOCUMENTS

| | | | | |
|---|---|---|---|---|
| 6,411,932 B1* | 6/2002 | Molnar | | G09B 19/04 704/254 |
| 2002/0023089 A1* | 2/2002 | Woo | | H04L 43/0876 |
| 2002/0171671 A1* | 11/2002 | Bou | | G09G 5/14 345/629 |
| 2004/0177139 A1* | 9/2004 | Schuba | | H04L 67/322 709/223 |
| 2006/0248580 A1* | 11/2006 | Fulp | | H04L 63/20 726/11 |
| 2011/0321122 A1* | 12/2011 | Mwangi | | G16H 10/60 726/1 |
| 2012/0173243 A1* | 7/2012 | Anand | | G06F 40/40 704/270.1 |
| 2014/0222433 A1* | 8/2014 | Govrin | | G06N 5/02 704/260 |
| 2015/0142704 A1* | 5/2015 | London | | G06F 40/58 706/11 |
| 2017/0235848 A1* | 8/2017 | Van Dusen | | G06F 16/904 705/12 |
| 2018/0145886 A1* | 5/2018 | Rao | | H04L 43/12 |
| 2018/0329878 A1* | 11/2018 | Hirzel | | G06F 16/24522 |
| 2018/0349113 A1* | 12/2018 | Boo | | G06F 8/40 |
| 2018/0367417 A1* | 12/2018 | Dixit | | H04L 41/0866 |
| 2020/0134018 A1* | 4/2020 | Laxman | | G06F 40/30 |
| 2020/0206920 A1* | 7/2020 | Ma | | G06F 11/3476 |
| 2020/0227029 A1* | 7/2020 | McConnell | | G06N 3/006 |

OTHER PUBLICATIONS

"International Search Report and Written Opinion Issued in PCT Application No. PCT/US20/012279", dated Apr. 24, 2020, 11 Pages.

* cited by examiner

CREATE AN ACTION

ACTION TYPE ⓘ

[ TEXT ▽ ]

RESPONSE... ⓘ

[ SO FAR YOU HAVE [$MEAT] ON [$BREAD] WHAT CHEESE DO YOU WANT? ]

EXPECTED ENTITY IN RESPONSE... ⓘ

[ [CHEESE ✕] ]

310 — REQUIRED ENTITIES ⓘ

[ [MEAT] [BREAD] ]

320 — BLOCKING ENTITIES ⓘ

[ [~~CHEESE~~] ]

☑ WAIT FOR RESPONSE? ⓘ

[ CREATE ]   CANCEL                    [ ⊕ ENTITY ]

*FIG. 3*

```
                    CREATE AN ENTITY
ENTITY NAME
┌─────────────────────────────────────────────┐
│ CHEESE                                      │
└─────────────────────────────────────────────┘
ENTITY TYPE
┌─────────────────────────────────────────────┐
│ NEW TYPE                                    │
└─────────────────────────────────────────────┘

☐  PROGRAMMATIC ONLY  ⓘ
   ☐  MULTI-VALUED  ⓘ
   ☑  NEGATABLE  ⓘ
```

*FIG. 4*

ENTITIES

MANAGE A LIST OF ENTITIES IN YOUR APPLICATION AND TRACK AND CONTROL THEIR INSTANCES WITH ACTIONS...

[ NEW ENTITY ]

🔍 SEARCH

| NAME | TYPE | PROGRAMMATIC | MULTI-VALUE | NEGATABLE |
|---|---|---|---|---|
| MEAT | CUSTOM | --- | --- | ✓ |
| CHEESE | CUSTOM | --- | --- | ✓ |
| BREAD | CUSTOM | --- | ✓ | ✓ |
| TOPPINGS | CUSTOM | --- | ✓ | ✓ |
| NAME | CUSTOM | --- | --- | --- |
| NOTUNDERSTOOD | CUSTOM | --- | --- | --- |

*FIG. 5*

CREATE AN ACTION

ACTION TYPE ⓘ

[ TEXT ▼ ]

RESPONSE... ⓘ

[ PHRASE... ]

ⓘ RESPONSE IS REQUIRED

EXPECTED ENTITY IN RESPONSE... ⓘ

[ ]

REQUIRED ENTITIES ⓘ

[ ]

BLOCKING ENTITIES ⓘ

[ ]

☑ WAIT FOR RESPONSE? ⓘ

[ CREATE ]   CANCEL                              [ ⊕ ENTITY ]

UTILIZING RULE SPECIFICITY IN CONVERSATIONAL AI

BACKGROUND

Bot services such as Azure Bot Service available from Microsoft Corporation provide tools to build, test, deploy, and manage intelligent bots. Software Development Kits made available through such bot services provide developers with tools, templates, and artificial intelligence (AI) services for the creation of bots that use speech, understand natural language, handle questions and answers, and provide other communication-based services.

Bots provide communication experiences to users that are more like dealing with a person, or at least an intelligent robot, than a computer. Bots may be used to shift simple, repetitive tasks, such as gathering profile information, to automated systems that may no longer require direct human intervention. A typical bot is an application that users interact with in a conversational way using text, interactive cards or images, or speech. Every interaction between the user and the bot generates an activity, and the associated bot service may send information between the user's bot-connected application and the bot. A channel may connect the bot to communication applications, where each bot is configured to connect to the channels on which the developer would like the bot to be available. Each channel may include additional information in the activities sent by the channel. Interaction with the bot may comprise simple questions and answers, or the interaction may be a conversation that intelligently provides access to such services.

Bots are similar to web applications that live on the internet and use application programming interfaces (APIs) to send and receive messages. Bots often consist of a web server that implements a conversational interface to communicate with bot builder tools that send and receive messages and events through interaction with memory storage. The bot builder tools also provide access to natural language processing and other cognitive and artificial intelligence services, as desired. Simple bots simply receive a message and echo the message back to the user, while more sophisticated bots may carry on an extended dialog with a user. Generally speaking, bots read and write files, use databases and APIs, and perform regular computational tasks. However, what makes bots unique is their use of mechanisms generally reserved for human-to-human communication to improve the user experience. Bots may be implemented in a number of consumer facing applications including, for example, virtual assistants that may or may not be personalized to customers. Bots are also made available across a broad range of conversational platforms and devices to perform a number of functions including greeting a user, collecting information, providing a service, or ordering a product.

When used to gather profile information, bots may ask users a series of questions in a specified sequence and store the responses in memory for later use. Bots may implement forms to execute steps in a particular order and to dynamically define field values, confirmations, and messages. Rules are used by developers to capture the developer's knowledge in conversational systems. For example, rules may be used to generate prompts or status messages or in goal-driven dialog management like filling in a form. However, a problem with rules is that adding a new rule often requires modifying existing rules, which makes rule-based systems more brittle and more difficult to modify.

SUMMARY

Various details for the embodiments of the inventive subject matter are provided in the accompanying drawings and in the detailed description text below.

The following description outlines an improvement to conversation understanding systems including bots that apply the concept of logical subsumption to classify rules from general to specific in order to provide an easier to use rule system to capture developer knowledge in creating a robust dialog management system. In a rule-based system, at each step the rule conditions are evaluated to determine which rule should run. Previous approaches have the issue that adding rules requires re-ordering or rewriting existing rules, which requires the developer to reason over the whole set of rules which is difficult and error-prone. On the other hand, under the rule system described herein, more specific rules are preferred to more general rules. If a more specific rule is triggered, the more general rule is not executed. An improved dialog management system is provided that applies the notion of subsumption from logic to conversational artificial intelligence. The resulting rule system integrates well with machine learning tools so that the machine learning tools and rules may be integrated together rather than forcing a choice of one or the other. A software development environment is also provided that exposes the subsumption-based rule system via an application programming interface (API) to developers.

In sample embodiments, the systems and methods described herein provide techniques for building a dialog-state specific contextual language understanding system for an application. In the sample embodiments, a method is provided that includes receiving information establishing rules identifying the conversational dialog to present in respective dialog states and using subsumption logic to arrange the rules into a directed acyclic graph (DAG) according to a hierarchy of specificity whereby more specific rules are preferred over less specific rules to support a many path conversational dialog. Those skilled in the art will appreciate that a DAG is a directed graph that has a topological ordering of a sequence of vertices (prompts or actions) whereby every edge is directed from earlier to later in the sequence and no vertex can reach itself via a nontrivial path. Triggers are also established that, when true in a dialog state of the conversational dialog, identify possible rules that are filtered to the most specific rules using the DAG. A conversational action for the application is performed based on selecting one of the most specific triggered rules for the dialog state. In the sample embodiments, the conversational action includes, for example, presenting a message, presenting a conversational prompt requesting additional information, modifying memory, and/or calling an application program interface.

Implementations of the sample embodiments described herein include using specificity to add additional rules to the conversational dialog without modifying established rules. During use, the dialog-state specific contextual language understanding system in the application is implemented and a received utterance from a user is analyzed with the dialog-state specific contextual language understanding system to determine triggers for triggering conversational prompts for the application. In sample embodiments, rules are identified where a Boolean trigger expression is true by evaluating predicate expressions against the dialog state and combining the rules using Boolean logic. Also, objects identified in conversational data from a user may be arranged into the directed acyclic graph whereby more specific rules and objects are selected over more general rules and objects for use in a conversational dialog.

The dialog-state specific contextual language understanding system described herein may be used with a machine learning application to improve the functioning of the machine learning application. For example, the machine learning application may learn to select a conversational action limited to a set of most specific triggered rules found in the directed acyclic graph that are true in the current dialog state rather than learning how to select from all possible rules and to apply subsumption rules to the conversational action to limit a number of actions possible in a given dialog state.

Further sample embodiments include a system with a platform for building a dialog-state specific contextual language understanding system for an application. The system includes at least one processor and a memory for storing and encoding computer executable instructions that, when executed by the at least one processor, is operative to receive information establishing rules identifying the conversational dialog to present in respective dialog states and to use subsumption logic to arrange the rules into a directed acyclic graph according to a hierarchy of specificity whereby more specific rules are preferred over less specific rules to support a many path conversational dialog. The instructions further establish triggers that, when true in a dialog state of the conversational dialog, identify possible rules that are filtered to the most specific rules using the DAG and perform a conversational action for the application based on selecting one of the most specific triggered rules for the dialog state. In sample embodiments, the conversational action includes presenting a message, presenting a conversational prompt requesting additional information, modifying memory, and/or calling an application program interface.

Implementations of such a system further include instructions in the memory that when executed by the at least one processor enable a user of the system to add more specific rules to the conversational dialog without modifying established rules. During use, the dialog-state specific contextual language understanding system is implemented by the application and the memory further includes instructions that when executed by at least one processor analyze a received utterance from a user of the dialog-state specific contextual language understanding system to determine triggers for triggering conversational prompts for the application. Further instructions may be executed to identify rules where a Boolean trigger expression is true by evaluating predicate expressions against the dialog state and combining the rules using Boolean logic and to arrange objects identified in conversational data from a user into the directed acyclic graph whereby more specific rules and objects are selected over more general rules and objects for use in a conversational dialog.

In further sample embodiments, the application implemented by the system is a machine learning application that learns to select a conversational action limited to a set of most specific triggered rules found in the directed acyclic graph that are true in the current dialog state rather than learning how to select from all possible rules and to apply subsumption rules to the conversational action to limit a number of actions possible in a given dialog state.

Further sample embodiments include a non-transitory machine-readable medium having instructions stored thereon that when executed by one or more processors cause the one or more processors to implement a method of building a dialog-state specific contextual language understanding system for an application. The method implemented by processing the instructions includes receiving information establishing rules identifying the conversational dialog to present in respective dialog states and using subsumption logic to arrange the rules into a directed acyclic graph according to a hierarchy of specificity whereby more specific rules are preferred over less specific rules to support a many path conversational dialog. The method implemented by processing the instructions further includes establishing triggers that, when true in a dialog state of the conversational dialog, identify possible rules that are filtered to the most specific rules using the DAG and performing a conversational action for the application based on selecting one of the most specific triggered rules for the dialog state. For example, the conversational action may include presenting a message, presenting a conversational prompt requesting additional information, modifying memory, and/or calling an application program interface.

Implementations of such a medium further include instructions that when executed by one or more processors enables a user of the dialog-state specific contextual language understanding system to add more specific rules to the conversational dialog without modifying established rules. When the dialog-state specific contextual language understanding system is implemented by the application, the instructions may further include instructions that when executed by the one or more processors analyze a received utterance from a user of the dialog-state specific contextual language understanding system to determine triggers for triggering conversational prompts for the application. Further instructions may be executed by the one or more processors to identify rules where a Boolean trigger expression is true by evaluating predicate expressions against the dialog state and combining the rules using Boolean logic and to arrange objects identified in conversational data from a user into the directed acyclic graph whereby more specific rules and objects are selected over more general rules and objects for use in a conversational dialog.

In further sample embodiments, the application is a machine learning application and the instructions further include instructions that when executed by one or more processors select a conversational action limited to a set of most specific triggered rules found in the directed acyclic graph that are true in the current dialog state rather than learning how to select from all possible rules and to apply subsumption rules to the conversational action to limit a number of actions possible in a given dialog state.

As discussed herein, the logic, commands, or instructions that implement aspects of the methods described herein be provided in a computing system including any number of form factors for the computing system such as desktop or notebook personal computers, mobile devices such as tablets, netbooks, and smartphones, client terminals and server-hosted machine instances, and the like. Another embodiment discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described herein, or other aspects depicted in the accompanying drawings and detailed description below. Such systems and computer-readable media including instructions for implementing the methods described herein also constitute sample embodiments.

This summary section is provided to introduce aspects of the inventive subject matter in a simplified form, with further explanation of the inventive subject matter following in the text of the detailed description. This summary section is not intended to identify essential or required features of the claimed subject matter, and the particular combination and order of elements listed this summary section is not intended to provide limitation to the elements of the claimed subject matter. Rather, it will be understood that the following section provides summarized examples of some of the embodiments described in the Detailed Description below.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

FIG. 3 illustrates a screen shot illustrating how required entities and blocking entities are filled in automatically via references in the template.

FIG. 4 illustrates an interface for creating an entity in a sample embodiment.

FIG. 5 illustrates sample entities created using the interface of FIG. 4.

FIG. 6 illustrates an interface for creating an action in a sample embodiment.

Figure 8:
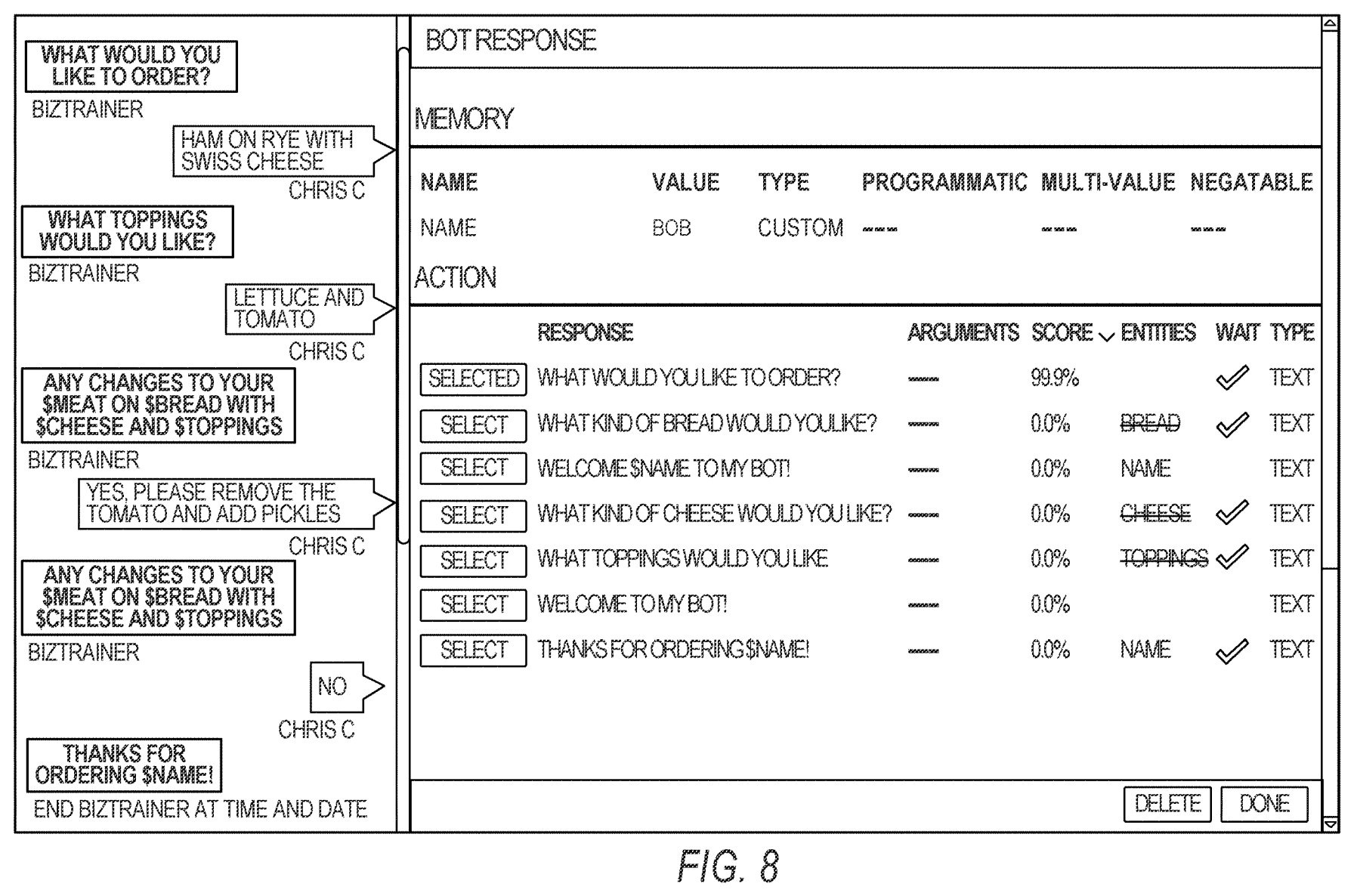

FIG. 8 illustrates a dialog interface depicting the flow of a bot response in a sample embodiment.

DETAILED DESCRIPTION

Figure 1:
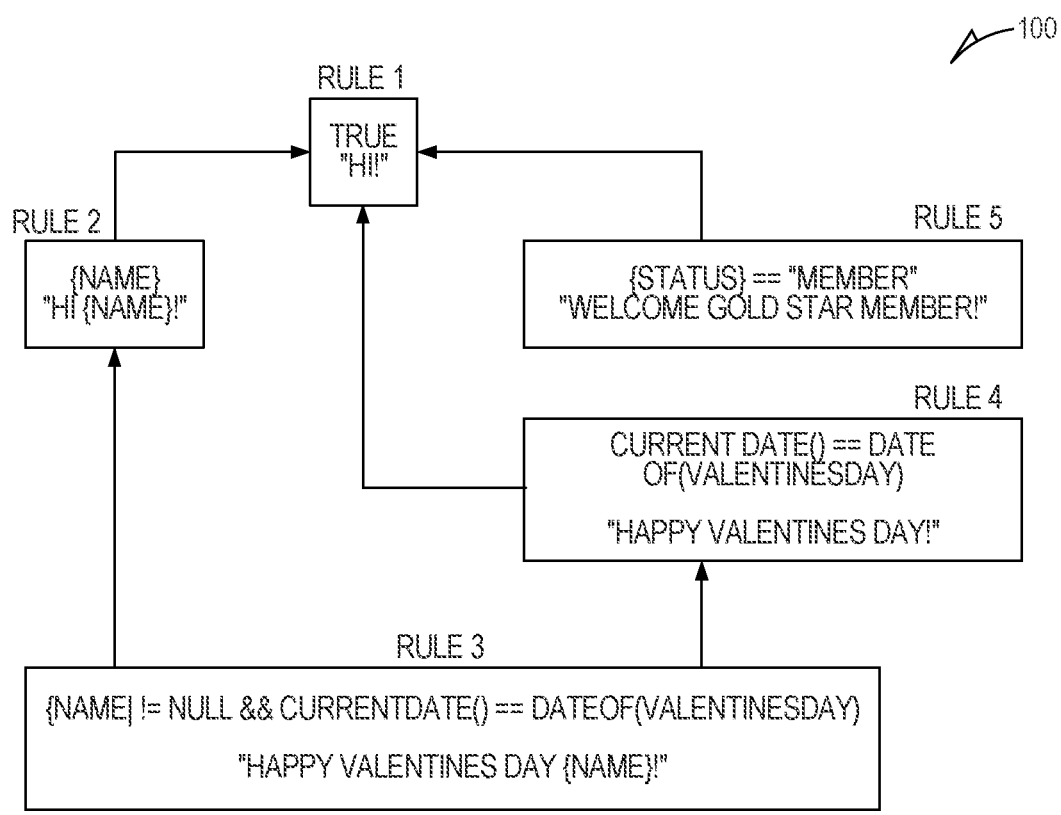
FIG. 1 illustrates a directed acyclic graph (DAG) showing the relationships amongst rules with an arrow on each rule pointing to more general rules.

The following description with respect to FIGS. 1-12 sufficiently illustrates specific embodiments to enable those skilled in the art to practice them. Other embodiments may incorporate structural, logical, process, and other changes. Portions and features of some embodiments may be included in, or substituted for, those of other embodiments. Embodiments set forth in the claims encompass all available equivalents of those claims. The example embodiments are presented for illustrative purposes only and are not intended to be restrictive or limiting on the scope of the disclosure or the claims presented herein.

The functions described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server, or other computer system, turning such computer system into a specifically programmed machine.

As used herein, dialogs are a central concept in software development kits for bots and provide a useful way to manage conversations with users. Dialogs are structures in the bots that act like functions in the bot's program where each dialog is designed to perform a specific task in a specific order. A dialog is started by an external stimulus, user input, or a previous dialog. A dialog is in control of the conversation with the user until it is done or interrupted. There are many different ways of controlling the flow of a dialog including forms, waterfalls, or rule-based systems like those described herein. A dialog library may be used to provide features such as prompts and waterfall dialogs to make the bot's conversation easier to manage. Prompts are used to ask for different types of information such as text, a number, or a date. Waterfall dialogs combine multiple steps together in a predefined sequence to allow the bot to follow the predefined sequence and to pass information along to the next step.

However, creating robust dialogs is difficult. More robust dialogs use rule triggering to generate text to guide conversations with users. Creating and managing the rules to create task-oriented dialogs has become the key to the creation of a robust dialog management system.

A bot implementing dialogs is inherently stateless. A different instance of a bot may handle any given turn of a conversation. As used herein, a turn consists of the user's incoming activity to the bot and any activity the bot sends back to the user as an immediate response. Some bots can either operate without additional information or the information required is guaranteed to be within the incoming message. For other bots, state (such as where the bot is in a conversation with a user or what data has been previously received about the user) is necessary for the bot to have a useful conversation. Dialogs thus may rely on persisted states across multiple turns in the dialog where each dialog turn may represent a different state. Without state in the dialogs, the bot would not know where it is in a dialog set or what information has already been gathered, thus making meaningful conversations difficult.

As noted above, rules are used by developers to capture the developer's knowledge in conversational systems. The rules associated with dialogs may be used to generate prompts or status messages or in goal-driven dialog management like filling in a form. However, as noted above, adding a new rule often requires modifying existing rules, which makes rule-based systems more brittle and more difficult to modify. Also, existing rules-based dialog systems have been difficult to integrate with machine learning. The dialog-state specific contextual language understanding system described below addresses these needs in the art.

As a simple example of a rules-based dialog system with which the dialog-state specific contextual language understanding system described herein may be implemented, it is desired to develop the rules for how to say to "hello" in a conversational system. Each of rules 1-5 below shows the Boolean logical expression with variable references in { } and functions with ( ) thereafter.

Rule 1: True→"Hi!"
Rule 2: {Name}!=null→"Hi {Name}!"
Rule 3: {Name}!=null && CurrentDate( )==DateOf(ValentinesDay)→"Happy Valentine's day {Name}"
Rule 4: CurrentDate( )==DateOf(ValentinesDay)→"Happy Valentine's day!"
Rule 5: {Status}="Member"→"Welcome Gold Star member!"

The directed acyclic graph (DAG) 100 illustrated in FIG. 1 shows the relationships amongst these rules with an arrow on each rule pointing to more general rules. Thus, the rules are organized in FIG. 1 from the most general rules at the top to the most specific rules at the bottom. The directed acyclic graph is static and defined by the rules. The set of triggered rules and most specific rules are dynamic and driven by the conversational state.

In a rule-based dialog system, at each step the rule conditions are evaluated to select which rule should run. As noted above, previous approaches have the issue that adding rules requires re-ordering or rewriting existing rules. To do this requires the developer to reason over the whole set of rules which is difficult and error-prone. The present inventor has discovered that by ordering the rules from most general to most specific and preferring the more specific rules to the more general rules in accordance with subsumption logic that a dialog system may be established that can be modified without having to re-order or rewrite the existing rules. In such a dialog system, if a more specific rule is triggered, the more general rule is not executed. By way of example, in FIG. 1, Rule 1 is more general than Rule 2, which is more general than Rule 3. Similarly, Rule 1 is more general than Rule 4, which is more general than Rule 3. Rule 1 is also more general than Rule 5. These relationships are established by the developer at the time the rules and dialogs are created.

The approaches usually taken to the problem of reordering or rewriting existing rules are rule weight or rule rewrite. In a rule weight approach, a weight is given to each rule and the one with the highest weight would run. Sometimes weights are defined implicitly by the order in which rules are defined, but this is the same as assigning weights. This approach requires the rules to be globally ordered and when adding a new rule the weight of the new rule needs to be established. The rule weight approach also has the problem that it is not expressive enough. For example, in the DAG 100 of FIG. 1, there are three partial orders. Where ">" indicates preference and referring to the rule number, we have 3>2>1 and 3>4>1 and 5>1. There is no single order which captures all the partial orders.

An alternative approach is to rewrite the rules to make it so that only the most specific rules will be triggered. In this case, the rules illustrated in FIG. 1 would be rewritten as:
{Name}==null && CurrentDate( )!=DateOf(ValentinesDay) && {Status}!="Member"→"Hi!"
{Name}!=null && CurrentDate( )!=DateOf(ValentinesDay)→"Hi {Name}!"
{Name}!=null && CurrentDate( )=DateOf(ValentinesDay)→"Happy Valentine's day {Name}"
CurrentDate( )=DateOf(ValentinesDay) && {Name}=null→"Happy Valentine's day!"
{Status}="Member"→"Welcome Gold Star member!"

However, this rule rewrite approach has the big disadvantage that adding or removing a rule requires rewriting all the current rules.

The solution described herein makes use of the notion of "subsumption" from first order predicate logic to automatically arrange rules into a directed acyclic graph (DAG) 100 as shown in FIG. 1. A rule condition subsumes another rule condition if it is more specific, i.e. out of all possible states of the world, there are fewer states that are covered. In logic, there is a well-defined way to compute this relationship. Intuitively, if a rule has a condition of "A" then a rule having a condition of "A & B" is more specific. In other words, condition "A" can happen both in situations where condition "B" does or does not happen. Furthermore, the relationships between predicates can be defined. For example, "Range (CartCount, 2, 5)" is more specific than "Range(CartCount, 1, 10)." Given the subsumption relationship amongst the rules, the system can automatically arrange the rules into a DAG as shown in FIG. 1. Once the DAG 100 is obtained, it is easy to use it to filter triggered rules so that only the most specific rules are selected. This allows rules to be added in any order and does not require either weighting or rewriting of the rules.

It will be appreciated that there is usually a set of most specific triggered rules in a particular state where one of them is selected to execute. Thus, for a set of all rules: (r1, r2, r3, r4, . . . ), based on the rules where the predicate evaluates to true a subset (r3, r9, r88) is available. Because the rules are placed in a DAG, the more general rules can be removed (i.e., if r9 subsumes r3, then the final set would be (r9, r88) from which a ruled to execute is selected). A rule could be picked randomly, the order defined, or by machine learning. As explained herein, a difference in the system described herein is that r3 is removed because of subsumption.

The dialog system described herein thus filters the triggered rules to select only the most specific rules. However, a selection policy is still required to determine which rule should run. For example, in the example illustrated in FIG. 1, if {Name} !=null and {Status}=="Member" and it is not Valentine's day, then rules 1, 2 and 5 are all triggered. Subsumption will filter out Rule 1, but Rules 2 and 5 are still possibilities. To select between them, the dialog system could pick randomly, use the order they were defined, or use machine learning to learn which choice is best. The subsumption approach is thus better for machine learning than the weighted rule approach because filtering out the possible candidates allows the machine learning software to learn faster with less data. The subsumption approach is also better than the rewrite approach because it is more modular to add rules.

The subsumption approach described herein is beneficial to bot developers as the rules provide a way of specifying desired behavior in an easy to understand and controllable way while still allowing machine learning to handle less specified situations. General rules can be defined and overridden in more specific situations. Moreover, the order in which rules are added does not matter as the subsumption logic will automatically arrange the rules by specificity. The flexibility of logic and being able to define predicates and their subsumption relationships means that bot developers can easily incorporate domain specific knowledge to extend conversational system rules for prompt and message generation and for goal driven dialogs. Also, as explained further below, the subsumption approach described herein enables the integration of machine learning as the selection policy for rules filtered by specificity.

Deriving Rules from Other Information

A dialog rule pairs a condition together with a particular action to, for example, show a status message, prompt for information, call an API, or modify memory. Rule conditions are a powerful and expressive way of describing when a rule applies that utilizes Boolean functions and logical connectives. In sample embodiments, a Boolean predicate checks conversational memory or interacts with external systems like databases for a true/false result. For example, a value could be checked to see if it has been specified in the conversation or if some value is found in an external database. The predicate Booleans are combined using Boolean logic, i.e., and/or/not. However, in many cases the rule condition can be inferred by default from information in the action. This simplifies using the rules while still allowing overriding the condition if needed. For example, consider the following action with a prompt that asks a user for the bread the user wants on a sandwich given that the dialog already knows the bread and cheese. In the prompts below, the { } refers to slots from memory, where a slot is simply a named value in memory. "Name" is an optional rule name, and "Prompt" is the message to display to a user. "Expected" tells the dialog system what kind of response to expect from the user.

Action:
Prompt: "What kind of bread do you want on your {meat} on {cheese} sandwich?"
Expected: bread
From this information, the following rule condition may be inferred:
Condition: valueOf("meat")!=null && valueOf("cheese")!=null && valueOf("bread")==null
The presence of {meat} and {cheese} in the prompt would lead to requiring meat and cheese to have values in the memory. Because the expected response is bread, this usually means bread is not already specified and should be null. If something were present in both the prompt and is expected, then the value would be presented like this:
Action:
Prompt: "Would you like to change any of your current toppings: {toppings}?"
Expected: toppings
From this response, the following may be inferred:
Condition: valueOf("toppings")!=null These inferred conditions can always be overridden by an explicit condition. For example, if the developer wished to offer a special to repeat customers, the following conditions and actions would be created:
Condition: valueOf("repeatCustomer") && valueOf("meat")!=null
Action:
Prompt: "What extra meat would you like on your sandwich?"
Expected: meat Another example of deriving conditions would be to have a rule that "consumes" values, i.e., a dialog would only be run one time for each newly specified combination of values. To implement this dialog, a special Boolean function "HasNewValues(RuleName, slots . . . )" is defined that tests to see if RuleName has run since any of the memory slot values have changed. In this example, a rule would look like this:
Name: SandwichStatus
Action:
Consumes: meat, cheese, bread, toppings
Message: "Your sandwich so far has {meat} and {cheese} with {toppings} on {bread}"

From the rule SandwichStatus, the following can be inferred:
Condition: valueOf("meat")!=null && valueOf("cheese")!=null && valueOf("bread")!=null && valueOf("toppings")!=null && HasNewValues("SandwichStatus", "meat", "bread", "cheese", "toppings")

From the consumed values, it can be identified that slot values should not be null, and a test can be run to see if this rule has run since the last time any of the slot values were modified.

Interaction Between Machine Learning and Rules

Rules are an easy to understand way for developers to reason about and control the aspects of a conversation they understand. Machine learning allows learning from examples which is great for situations where the decision making is less clear cut. If one were to use a pure machine learning approach, it would require many more examples to achieve the same level of accuracy and it is hard to know what the machine learning has learned or to know what examples should be added to quickly improve choices. However, combining rules and machine learning achieves the best of both worlds. Rules are a quick way to express the constraints a developer understands or to fix issues, while the machine learning system would be able to learn from fewer examples and be constrained to good choices. The rules provide a limited set of choices at each step, all of which are reasonable choices given the conversational state. Which most specific rule to select can be determined by selecting one rule randomly, selecting the rules in the order defined, or via a machine learning system which utilizes the conversational history to decide on the correct choice.

To illustrate the use of machine learning and rules together, imagine there are 100 actions like the ones described above. Some are saying "hello." asking for specific slots or performing actions. The dialog management system is trying to decide at each step the best action to take. If only machine learning is used, then at every step the machine learning must learn to distinguish amongst all 100 actions. The machine learning system is always deciding if it should say "hello" or ask for meat—even if it has already asked. On the other hand, if there are rules, then the number of actions possible at a given conversational state is much smaller, usually less than five options, and all the choices are reasonable ones given the conversational state. The use of rules thus allows the machine learning system to learn from fewer examples because it has an easier choice to make. Additionally, if the developer decides an action should not be possible at a particular step, then the developer can reason over the conversational state and modify the conditions.

Conversational Robustness and Conversational Flow Charts

Many conversational systems start with a conversational flow chart to model conversation. Conversational memory captures the state of the conversation. The challenge though is that real conversations do not flow in ways that are simple to capture in a conversational flow chart. In real conversations, people correct previous information, answer questions that were not yet asked, ask for help or interrupt. If a dialog is modeled using a conversational flow chart, it is very difficult to handle these kinds of complexities. In a conversational flow chart the mental model is "I just did this step, so I will do this step next," all in accordance with the directed acyclic graph. In contrast, the rule-based approach emphasizes the mental model of "it does not matter how I got to this state but given that I am in this state what is a reasonable thing to do?" There may be 100 different paths for getting to a conversational state—maybe the user gave all the values as a single utterance, or maybe each value was prompted for individually. However, with the rule-based approach, it does not matter what path is taken to a particular conversational state. This rule-based approach provides a compact way of capturing all the possible paths to a state without having to explicitly capture all of them in a conversational flow chart. Not having to track how a conversational state is obtained allows for easy persistence.

It will be appreciated by those skilled in the art that even though conversational flow charts are not a good way to model conversations, they are still useful as a communication tool to help people understand how rules interact. The simplest way to generate a conversational flow chart is to select from the possible rules, update the memory based on expected values, and then repeat. The rules-based approach focuses on what to do when the conversational memory is in a given state. This approach captures the golden path of conversation that can be refined further by looking at the conditions to identify what values would affect further rules. However, what this approach does not capture is actual conversational robustness, i.e. extra information, corrections or interruptions. It is possible to add more elaboration to the conversational flow chart but as the complexity of real conversations is captured it becomes less and less useful as a communication tool. The rule-based approach described herein provides a mechanism (subsumption) by which to program the selection of rules applicable to a given conversational memory state by applying logical reasoning to the rule triggers. The use of subsumption logic enables the developer to handle the conversational complexity to obviate many of the concerns with using conversational flow charts.

Dialog Management

One of the challenges in conversation is how to create a robust, easy to use and understand conversational framework that can handle conversations that allow conversational shortcuts and interruptions. In addition, this framework should allow the integration of many different technologies and should be easy to extend using a Bot Builder Software Development Kit of the type available from Microsoft Corporation, for example.

There are many forms of conversation that need to be integrated:
- Goal oriented conversation—the bot is driving the conversation. Examples of this include activities like form-filling.
- User driven/reactive conversation—the user is driving the conversation. Chit-chat falls into this category as well as interruptions to goal oriented conversations or iteratively refining a database query.
- Proactive conversations—the conversation is driven from events outside of the bot. For example, telling someone that an alarm went off.

Also, to support dialog management, the dialog management system may standardize on payloads that have a core common schema and can optionally have additional information attached to them. Common types of schema include utterances of users in conversations, messages from a bot to a user, and a task having a set of utterances for triggering the task and a parameterized function to call when those utterances are considered a match. As noted below, the triggers may be Boolean combinations of Boolean predicates that evaluate against conversational memory and external information such as information stored in databases.

Figure 2:
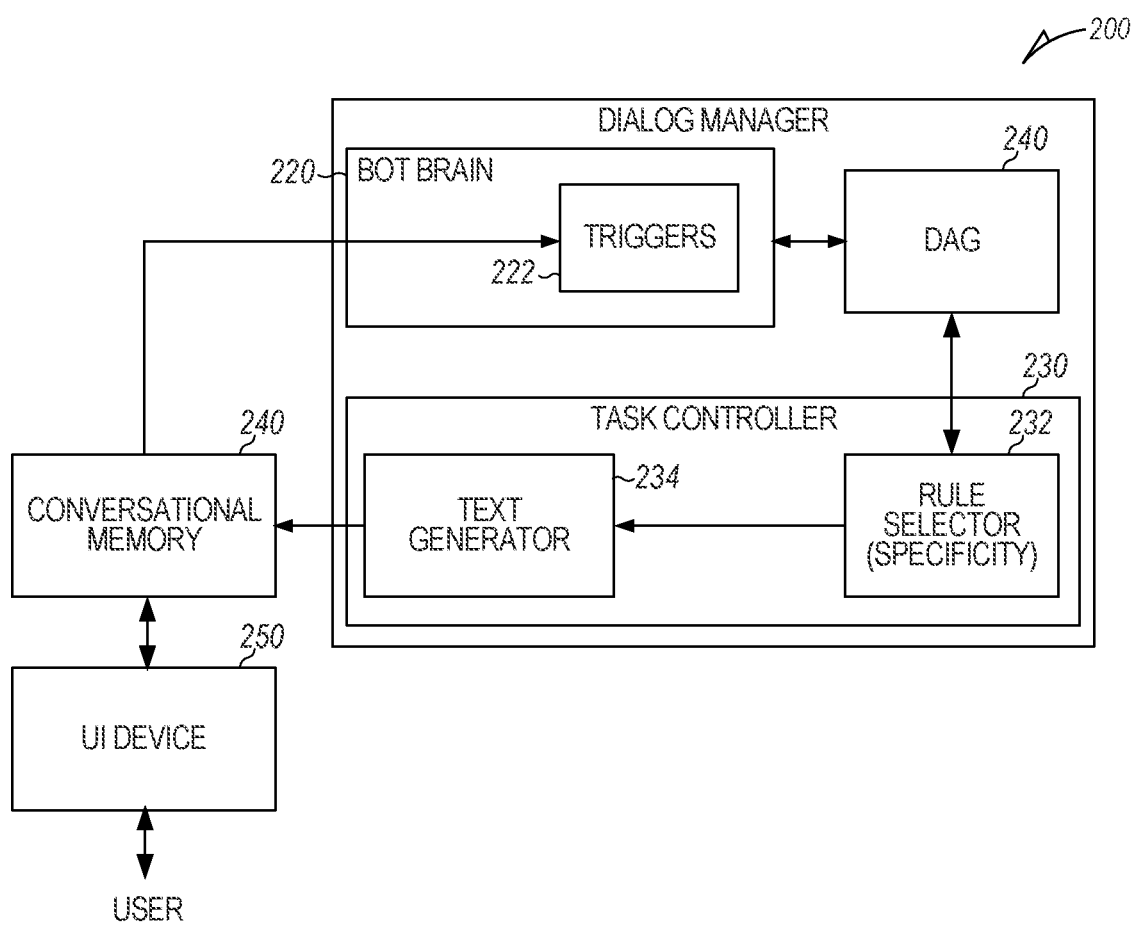
FIG. 2 illustrates a dialog management system in a sample embodiment of a bot that implements the techniques described herein.
Figure 7:
FIG. 7 illustrates sample actions created using the interface of FIG. 6.

FIG. 2 illustrates a dialog management system 200 in a sample embodiment of a bot that implements the techniques described herein. Like the interaction assistant described in U.S. Patent Application Serial No. US 2018/0174585, the dialog management system 200 of FIG. 2 implements a dialog manager 210 with dialog states defined in terms of templates and logic deduction rules. However, as will be described in more detail below, the dialog management system 200 of FIG. 2 selects the rules to be applied in the respective states using subsumption logic as described herein.

The core parts of the dialog management system of FIG. 2 include a bot brain component 220 that is responsible to determine when a conversation should be started, continue current task, interrupt for a new task, consider a current task complete, consider the current conversation complete, dispatch to a different bot to handle, or handle global flow control interruptions (cancel, help, go back, start over, etc.). In general, the bot brain 220 is responsible for deciding on each user utterance whether to continue the current task, or what task to switch to. The core parts of dialog management of dialog management system 200 also include a task/bot control component 230 for managing a sequence of communications with a user. Sometimes this is as simple as a one-shot reply to a question like "When are you open?" and sometimes it is a complex conversation filling in a form or doing a search.

The tasks to be implemented by the dialog manager 210 are established by the developer during creation of the bot and are implemented in the bot brain 220. To implement the tasks, the bot brain 220 evaluates the conversational information from the user to establish the conversational state of the current dialog and identifies triggers 222 in the conversational information. The triggers 222, when true in a dialog state of the conversational dialog, identify possible rules that are filtered to the most specific rules using the directed acyclic graph (DAG) 240, where the rules are arranged in DAG 240 based on subsumption. One of the most specific triggered rules is selected by rule selector 232 using subsumption logic as described above. The most specific triggered rules may be selected in a variety of ways including using machine learning. As noted herein, if machine learning is used, then the filtering of the rules enables the learning to occur more rapidly. As noted above, in a given conversational state there is a set of triggered rules where any rule can be removed that has a more specific trigger rule. The text generator 234 of task controller 230 then generates the appropriate text/speech for the selected rule. The conversation then continues in accordance with the task selected by the bot brain 220 under control of the task controller 230.

In the embodiment of FIG. 2, the dialog management system 200 further includes a conversational memory 240 that stores and tracks the conversations with the UI device 250 of the user. The conversational memory 240 has structured values to represent the state of the conversation including information from the user and tracking of programming state like when a rule ran. The conversational memory 240 operates independently of the dialog manager 210 and does not impose any policies on the conversational data in an active or changing dialog. Importantly, the conversational memory 240 provides the information needed to identify the conversational state. For example, the dialog manager 210 uses the rules to determine what tasks to perform when a particular memory slot in a dialog is empty. The dialog manager 210 may, for example, generate a new dialog if an entry in a memory slot has changed since the last time a rule was run.

The conversational memory 240 creates a new dialog each time a new dialog is invoked. As such, the dialog is tied to intent for the dialog and provides an optional activation expression over the conversational memory 240. When the dialog is invoked, it takes control of the conversation flow. Every new message from the user will be subject to processing by that dialog until it either closes or redirects to another dialog. The conversational memory 240 includes possible memory slots defined by the entities and intents implemented by the invoked dialog and provides the data used by the bot brain 220 to trigger dialog expressions for different types (e.g., messages, prompts, code, etc.) based on the invoked dialog.

The trigger tree implemented by triggering element 222 may apply Boolean expressions to the stored dialog data to identify any predicates with and/or/not Boolean logic. As appropriate, the conversational data is quantified by any/all quantifications for each object. As noted above with respect to FIG. 1, the dialog objects are arranged in the DAG 240 such that specialized rules/objects override generalized rules/objects using subsumption logic to thereby simplify rule interactions. As noted herein, the subsumption organization provides plug-in optimization of the rules and specialization.

There are many ways of implementing tasks including procedural, Question and Answer (QnA) Maker, or Conversation Learner. Blending between these different kinds of conversation is difficult. Consider the following example:

```
"What sandwich would you like"?            // Goal driven and open ended
→Ham on wheat                              // Robust response
"What kind of cheese do you want on your ham on wheat?" // Guidance
→Do you have any specials?                 // Reactive user initiated
"Currently we offer $1.00 off on Yakima and Fuji sandwiches"
"Would you like to order one of them?"
→No
// Resumption of the previous conversation
"Do you want to continue building your Ham on Wheat sandwich?"
→Yes
"What kind of cheese do you want on your ham on wheat?"
→What hours are you open?                  // Reactive, one-shot
"Between 8am and 4pm daily"
"What kind of cheese do you want on your ham on wheat?"
Roast beef and cheddar                     // Correction
...
```

In this example, when the bot asks for cheese and the user asks for specials, the user has specified an intent that is different than the entities that were expected so the bot needs to move to another intent. When the user did not want to order a special, the bot gave the user the option of returning to the sandwich they were building. Similarly, when the user asked for hours, that could be in a QnA Maker which uses an entirely different technology for an answer. The bot then immediately continued the current conversation. The bot brain 220 is the component that is responsible for doing this kind of interruption and resumption that permits complexity to be added to the conversation without jumping to something new and losing the original intent of the conversation.

In another example, the bot makes inferences as in the following example:

In this example, by tracking the city and weather data, the bot detects what the user wants to do by identifying their intent, which is determined from the spoken or textual input, or utterances. The intent as determined from inferences may be used to map utterances to actions that the bot should take by, for example, identifying possible dialogs to run when the conversational data in the expected slots is changed. The bot may also extract entities, which as important words in the utterances to infer the user's intent. Such features are commonly provided by a language understanding service made available on bot services platforms such as Azure Bot Service available from Microsoft Corporation. The inferences may also be used to automatically generate new states and/or rule selections by the bot brain 220.

Rule-Based Tasks

As noted above, the systems and methods described herein provide mechanism for ordering and triggering rule-based tasks. A rule-based task breaks up a dialog into individual messages and prompts that are triggered based on the state of memory and the dialog state. As noted above, a key insight is that by focusing on state independently of how you got there it makes it easier to create robust rule-based dialogs. Any model that requires enumerating specific paths through conversational space will be difficult to use/understand because of the combinatorics involved. By focusing on what to do in a state, it is possible to create conversational elements that apply in many different situations.

Subsumption triggering analyzes the logical structure of trigger conditions to organize the rules into a hierarchy from general to specific. This allows writing general rules and then being able to easily override them in specific situations

```
Topic: {
    Intent: "Weather",
    PossibleSlots: ["City", "WeatherDate"],
    Actions: [
        { Action: "What city would you like the weather for?",
          ExpectedSlots: ["City"],
          Infer m => m.Get("City") == null},
        { Action: "What date in {City}?",
          ExpectedSlots: ["datetime/WeatherDate"],
          Infer m => m.Get("City") ! = null && m.Get("WeatherDate") == null},
        { Name: "Weather0",
          Action: Weather("City", "WeatherDate")
          Consumes: ["City", "WeatherDate"]
          Infer m => m.Get("City") ! = null && m.Get("WeatherDate") ! = null
               && m.Get<State>("Weather0").HasNewValues
            Set("Weather0", new ChangeTracker("City", "WeatherDate"))}
]}
``` without having to be aware of or modify the more general rules. A rule-based task has the following components:

Invocation: This could either be a Language Understanding (LUIS) intent or set of utterances to trigger this task in the bot brain 220.

Modules: The set of rule-based modules that make up this task.

Module Manager: The code for determining how rule-based modules are used.

Rule-Based Modules

In sample embodiments, a rule-based module includes a set of related rules that utilize subsumption to decide within the module what rules should be selected. A trigger is the logical expression that describes when the module should be triggered. In each state it is possible to have multiple reasonable choices. A selector is provided that determines which rule to invoke among the possible candidates. Some example selectors include picking randomly, in the order rules are defined, or through a mechanism like Conversation Learner. Intents that are involved in a task provide a mechanism for identifying what intents the task wants to include. If regular expressions are being used, this would be the set that should be active.

Entities involved in a task consist of a core entity type and a role. By default, the role and the core entity type are the same. This provides a mechanism for helping the recognizers for evaluating an utterance know what recognizers should be active throughout the conversation. It also defines the memory "slots" that will be available in the memory. Entities are usually simple values, but they can also be more complex objects as well. For example, there could be an Address (Street, City, State, Zip) entity which could play the roles of Home or Work. That would mean the memory has a slot for Home and a slot for Work and when those slots are referred to, access to the parts would be provided. For example, Home.City would be the City field in the Home entity.

In sample embodiments, each rule has the following components:

Trigger: The logical expression that describes the states when a rule would be reasonable to execute. Initially, the trigger is a simple conjunction of tests over the contents of memory. The trigger may also include disjunctions, conditions on the current time/location, or based on cardinality ranges. Subsumption logics have well-understood algorithms for extending such conditions. Support may be provided for any/all quantifiers that specify the range a variable can take.

Messages: A set of messages/templates to send from the bot to the user. The messages could be simple text or a card. Each time the rule triggers, one of the choices may be randomly selected.

Recognizer: Optional recognizer for recognizing what the user utterance means.

Expected Entities: Optional list of expected entities. By standardizing the expected entities, a way is provided to talk about context and build multiple layers on top of recognizers.

Repeat: Optional policy for repetition. Implementation of the policy is controlled by the selector. It is possible to configure repetition on a per-rule basis that should be respected by the selector. Possibilities include:

a Once: Only execute the rule once. This may be the default for simple messages.

b Selector Default: Repetition is defined by the selector.

c While Possible: Will repeat until this rule is no longer triggered or is subsumed. This may also be the default.

d Fixed Retries: Try a certain number of times before giving up.

For messages, the default should be "once." and for prompts "while possible." Triggers can be expressed over the conversational state. This can include the values filled in so far, dynamic values like the current time, last response or system generated things like how many times there has not been a successful rule or the emotional state of interactions with the current rule. A language independent way of expressing these Boolean expressions is generally desirable in order to provide a standard system that can reason over the expressions to do subsumption.

To write general rules, it is generally desirable to support parameterized matching, which allows matching any of the entities in a task. For example, Unbound(Entity) would match any task entity that is not currently bound. Unbound("Meat") would match specifically the "Meat" entity and Meat="ham" would specifically test to see if the current "Meat" entity is "ham." From a subsumption viewpoint, each of these would be more specific. Some example conditions include:

Entity==null—true for any unbound entity.

Meat==null—true if the Meat entity is not currently bound.

Meat !==null—true if the Meat entity is currently bound.

Optional("Meat")—if meat is bound this is more specific, otherwise this evaluates to true.

Status=="gold"—true if the current status is "gold."

CartCount>1 && CartCount<5—true if CartCount is in this range.

Feb. 14, 2019—Now( )<timespan(1, week)—true if within a week of Valentine's day.

In addition to persistent memory changes, there would also be transient ones as well. Some examples include:

CurrentRetries>1—number of times the system has not been able to satisfy a rule.

Emotion=="frustrated"—this would indicate the emotional analysis of the last user input.

ExpectedEntities(Entities)—current set of expected entities.

There are also transient conversational events that can be triggered on—each class of event disappears in a well-defined way. If there is a trigger on entity events, there is also an old accessor to get access to the previous value. This is useful so that status messages may be written to identify what is happening. For example, the status messages may include:

AddedEvent("Meat")—the meat entity was just set for the first time.

RemovedEvent(Entity)—some entity (Entity) was just removed.

ChangedEvent("Bread")—the bread entity just changed values.

UnexpectedEvent("Cheese")—the user unexpectedly modified Cheese, i.e., the user was asked, "What bread do you want?" expecting Bread as an entity and the user said "wheat with swiss cheese." In that case, an AddedEvent(Bread) and UnexpectedEvent(Cheese) are obtained.

NotUnderstoodEvent("Text")—text which is not understood.

IntentEvent(Intent).

There are also a number of other operators as well, including:

Type(Entity)—returns the type of the entity.

Cardinality(Entity)—returns the cardinality of the entity.

Choices(Entity)—for an entity defined by a dictionary the possible values are returned.

Name(Entity)—returns the name of an entity.

Value(Entity)—returns the current value of the entity.

With these kinds of predicates, the following conversations with unexpected answers can be handled:

"What kind of cheese do you want?"
hamburger
I changed ham to hamburger.
"What kind of cheese do you want?"
swiss
"I added swiss cheese to your sandwich"

Subsumption/Specificity

One of the problems of rule-based systems is that when they start to scale it becomes difficult to control and understand what rule to use when multiple rules are possible. As noted above, the basic notion of subsumption is to describe states by a logical expression and then use an algorithm to identify when a logical expression is more specific than another one, i.e. subsumes it. In the conversational context, this allows defining very general rules that cover lots of situations and then seamlessly cover more specific situations by adding new more specific rules—without having to modify or be aware of the more general rules.

An example of subsumption will be considered with respect to output generation. The following example uses the FormFlow template language of Microsoft's Bot Framework version 3 SDK to create a guided dialog where anything in { } is substituted and {? . . . } is a conditional template that is empty unless every variable referenced inside is present. A random selection template element is denoted by {^|}. This language expresses many different patterns in a compact way. If there are 5 conditional expressions, it implicitly represents 5!=120 different templates. Ignoring the trigger for now, the template column below identifies some of the things that the developer would like the bot to say:

| ID | Trigger | Template |
| --- | --- | --- |
| 1 | | Welcome! |
| 2 | Name | Welcome {Name} to my {^awesome great} bot! |
| 3 | Name && Title* | Welcome {? {Title}} {Name} to my super bot! |
| 4 | Name && Date(2/14) | Welcome {Name}, Happy Valentine's day! |
| 5 | Name && Title | {Title} {Name} welcome! |

The trigger column is populated by default from the state references in the template and represents the conditions necessary for applying that template. The triggers with an asterisk are optional. If they are not present, the template still applies. If they are present, the template applies but as a more specific trigger. Additional triggers like Date(2/14) can also be added which tests the date to see if it is Valentine's day. From an authoring perspective, it might make sense to have a whole block of templates that all are triggered by that condition. Depending on the conversation state, there can be many different possible templates which are triggered, but it is not appropriate to choose randomly from all of the triggered ones. For example, if one has {Name}, it would not be appropriate to just say, "Welcome!" Rather, it would be more appropriate to use the most specific set of responses (i.e., by saying "Welcome {Name}"). To this end, subsumption can be used where more general concepts that are covered by more specific concepts are subsumed. In the simple case of conjunction, if something else is valid and it has all of the variables, then the more general concept is subsumed. The one wrinkle here is that variables found in optional clauses are considered subsumed by required matches. This allows a generic catchall combination while still taking control of some specific combinations.

Based on the above template table, the following are sample templates to choose among in various situations:

{ }: 1
{Name}: 2, 3
{Name, Title}: 5 (not 3 because Title is optional in 3 and required in 5)
{Name, Date(2/14)}: 4
{Name, Title, Date(2/14)}: 4, 5

To choose among the triggered templates, a rule selector could either choose randomly (or perhaps weighted randomly) or choose without replacement. This scheme allows a lot of variation while preferring more specific responses and it is expressed in a compact and decoupled way. Also, a path is provided for adding additional triggers like Cart.Count>1 or (CustomerRating==preferred||CustomerRating=elite) since subsumption is a well understood problem.

Taking this a step further, various pools of these templates could be provided so the bot could say:

1. Choose from a holiday greeting pool of templates. (Which might have no triggered items at a given time.)
2. Choose from a status pool of templates. This allows a response like "So far you have {?{Number}} [{? {Size}} {? {Crust} crust} {?{Toppings}}] pizza" which will apply to any subset of {Number}, {Size}, {Crust} and {Toppings} while also being able to perform rules that override specific combinations to express them in a different template like "We have {Number} {Kind} pizza getting ready!"
3. Choose from a prompt pool of templates.

Each of those pools is independent and one could end up with a large number of appropriate output expressions without having to be explicit about all of the combinations. The developer can also add more specific templates without needing to understand how they interact with the other alternatives. The pools themselves could also be named by using triggers so that they could overlap and allow greater expressiveness.

In summary, by adding a mechanism for triggering off the bot memory/state and subsumption reasoning, a conversational dialog system is provided that is compact, compositional, expressive, declarative, predictable and easy to reason about.

The same sort of scheme can be extended to make form filling goal driven in a less linear way that leverages the ability of natural language to answer multiple questions at once. This allows more natural and user driven interactions. The following trigger table provides not just a template, but also a prompt and the corresponding recognizers as well:

| ID | Trigger | Prompt Template | Recognizers |
| --- | --- | --- | --- |
| 1 | !Bread | What kind of bread would you like? | BreadR |
| 2 | !Cheese | What kind of cheese would you like? | CheeseR |
| 3 | !Meat | What kind of meat would you want? | MeatR |
| 4 | !Cheese | I know this is cheesy, but are you? | CheeseR |
| 5 | !Bread && !Cheese | We still need to know your bread and cheese. | BreadR, CheeseR |

| ID | Trigger | Prompt Template | Recognizers |
|----|---------|-----------------|-------------|
| 6 | !Bread && !Cheese && !Meat | What kind of sandwich would you like? | BreadR, CheeseR, MeatR |
| 7 | Bread && !Cheese | What kind of cheese would you like on your {Bread} sandwich? | CheeseR |

The first 4 triggers would provide the equivalent of FormFlow where one item is picked at a time, but with random selection there would be variation in both the order picked and the prompt shown. Triggers 5-7 make it so that in some specific combinations there is a prompt which is asking for a more natural language-oriented response. Again, there is the ability to easily add variation or more specific handling without losing the fallback to simple linear dialogs. This whole process is also open to authoring declaratively by editors.

Based on the above template table, the following are sample templates to choose among in various situations:
{ }: 6
{Bread}: 3, 7 (2 and 4 are subsumed by 7)
{Cheese}: 1, 3
{Bread, Meat}: 2, 7 (4 is subsumed by 7)
{Meat}: 1, 2, 4, 5

The same scheme could be applied to reactive recognizers as well. For example:

| ID | Trigger | Recognizers |
|----|---------|-------------|
| 1 | RegisteredUber | BookUberR |
| 2 | RegisteredLyft | BookLyftR |
| 3 | | Help |
| 4 | | Cancel |
| 5 | RegisteredUber && RegisteredLyft | BookUberOrLyftR |

Another application might be help strings where rather than wanting to pick one randomly the bot would combine all the triggered matches. If HelpR, BreadR, CheeseR and MeatR were all active, then 3, 4 and 5 would be combined for help. Of course, by combining them all, the bot would lose the ability to allow variation as in output generation, so it might make sense to allow multiple alternatives for one possibility as follows:

| ID | Active Recognizer Trigger | Help |
|----|---------------------------|------|
| 1 | BreadR | For bread enter rye, wheat or onion. |
| 2 | CheeseR | We have swiss, cheddar or pepper jack cheese. |
| 3 | BreadR && CheeseR | Popular combinations of bread and cheese are rye and swiss or onion and cheddar. We also have wheat bread and pepper jack cheese. |
| 4 | MeatR | We have many excellent meats including ham and pepperoni. |
| 5 | HelpR | You can ask for help by typing "help" or "?". |

Sandwich Order Example

For example, imagine form generation for a simple form: SandwichOrder. The entity type of each is specified together with the expected cardinality and whether the developer wants to allow adding and removing the entity, i.e. it is "negatable." In this example, the entity type may be listed as:
    Bread: list, singleton, negatable
    Meat: list, singleton, negatable
    Cheese: list, singleton, negatable
    Ingredients: list, multiple, negatable
Below are the automatically generated rule-based tasks for the task "SandwichOrder" invoked by "OrderSandwichIntent" and modules "Form," "Status," and "Help" managed by a "Default" ModuleManager. The rule-based tasks take full advantage of the framework to express a compact set of initial rules. Further refinements show how the default rules may be extended to incrementally improve the task. It is not necessary to understand the base rules to provide simple improvements.
/*
This is the main form module.
When the module starts, the event StartEvent("SandwichOrderForm") is raised.
Selector defines how ties between rules are handled. In this case, the rules define the order to ask for sandwich elements and then by the order of Entities, i.e., the bot asks for Bread, Meat, Cheese, Ingredients in order. Alternative strategies would be to ask randomly, or to use BLIS.
Entities are all the entities relevant to this module.
Repetition defines how rules from this module are matched. In this case while here is a matching rule the bot would keep running the rule.
*/
Module: SandwichOrderForm
Selector: ByOrder
Entities: Bread, Meat, Cheese, Ingredients, AllDone
Repetition: WhilePossible
/*
This is equivalent to the default templates in FormFlow.
To develop the templates further, different rules may be used for choice, numeric or datetime entities. (Or whether to use cards, lists or just text.)
The default templates are the "background" templates. If a more specific rule is added, it overrides the default template through subsumption.
This trigger makes use of the "Any" quantifier over the possible form fields, which allows specifying a compact rule that applies to many possibilities.
*/
Trigger: Any(_Entity, FormFields( )): Unbound(_Entity)
Messages: ["What {Name(_Entity)} do you want?" ]
Recognizer: LUIS
Expected: _Entity
/*
This is a simple confirmation.
It also adds an entity which has to do with the conversational state rather than the fields in the form.
*/
Trigger: Bound(Bread) && Bound(Meat) && Bound (Cheese) &&
Bound(Ingredients) && AllDone !="done"
Message: "Completed with
    Bread: {Bread}
    Meat: {Meat}
    Cheese: {Cheese}
    Ingredients: {Ingredients}
    Change your choices or type "done" to finish."

Recognizer: LUIS
Expected: Bread, Meat, Cheese, Ingredients, AllDone
/*
This module is responsible for status messages as a dialog progresses.
By default, it handles unexpected updates like when the bot asks for cheese and gets "hamburger."
This is also a place where the bot could add things like: "So far, I have a {Meat} on {Bread} sandwich."
*/
Module: Status
Trigger: UserResponseEvent(_Module)
Selector: ByOrder
Repetition: WhilePossible
Trigger: Any(_Entity, FormFields( )): UnexpectedEvent(_Entity)
Messages: ["Changed {Name(_Entity)} {? from {Old(_Entity)}} to {_Entity}"]
    // This module is responsible for handling the "help" intent.
    Module: Help
    Trigger: IntentEvent("Help")
    Selector: ByOrder
    Repetition: WhilePossible
    // Provide help for list-based entities.
    Trigger: Any(_Entity, FormFields("List"): ExpectedEntity(_Entity)
    Messages: ["We are expecting a {Name(_Entity)} which includes these choices: [{Choices(_Entity)}]"]
    // Provide help for string-based entities.
    Trigger: Any(_Entity, FormFields("string"): ExpectedEntity(_Entity)
    Messages: ["We are expecting a {Name(Entity)}."]
    With this definition a possible interaction would look like:
"What bread do you want?"
Wheat
"What meat do you want?"
Ham
"What cheese do you want?"
swiss
"What ingredients do you want?"
Lettuce and tomato
"Completed with
    Bread: Wheat
    Meat: Ham
    Cheese: swiss
    Ingredients: Lettuce and tomato
Change your choices or enter 'done'
done
    Now because of the other modules and using LUIS as the recognizer, a more complicated interaction might look like this:
//Enter multiple things at once and get back confirmation on unexpected
//response.
"What bread do you want?"
Ham on rye
"Changed meat to ham"
// Ask for help
"What ingredients do you want?"
Help
"We are expecting ingredients from [lettuce, tomato, pickle]"
// Restate question and handle removing pickles
"What ingredients do you want?"
Lettuce, tomato and no pickles
"Completed with
    Bread: Wheat
    Meat: Ham
    Cheese: swiss
    Ingredients: Lettuce and tomato
Change your choices or enter 'done'
Done
    Binding multiple things causes some of the steps to be skipped. In addition, by using LUIS as a recognizer, it is possible to ask for everything all at once and to confirm what is added in a more natural way. To do this, the following rules may be added to the SandwichForm module:
//Initial question to encourage asking for everything at once
Trigger: All(_Entity, FormFields( )): Unbound(_Entity)
Messages: ["What do you want to order?", "What awesome sandwich would you like to create?" ]
Recognizer: LUIS
Expected: Bread, Meat, Cheese, Ingredients
Trigger: All(_Entity, FormFields( )): Bound(_Entity) && Unbound("ChangeConfirmation")
Messages: ["Would you like to change your {? {Meat} on} {Bread} {? with {cheese}} {? and toppings of {Ingredients}}?"]
Recognizer: LUIS
Expected: YesNo:ChangeConfirmation
Trigger: All(_Entity, FormFields): Bound(_Entity) && ChangeConfirmation="no"
Messages: ["Thanks! I will order your sandwich!" ]
Trigger: All(_Entity, FormFields): Bound(_Entity) && ChangeConfirmation=="yes"
Messages: ["What would you like to change on your sandwich?" ]
Recognizer: LUIS
Expected: Bread, Meat, Cheese, Ingredients
With these changes, the dialog would look like this:
"What do you want to order?" (or "What awesome sandwich would you like to create?")
ham on rye with American cheese
"What ingredients do you want?"
Lettuce and tomato
"Would you like to change your ham on rye with American cheese and toppings of lettuce and tomato?"
No
I will order your sandwich.
The dialog may be further improved to indicate progress at some intermediate points. For example:
Trigger: Bound("Meat") && Bound("Bread") && Unbound("Cheese") && Unbound("Ingredients")
Messages: ["What cheese and ingredients do you want to add to your {Meat} on {Bread} sandwich?" ]
Recognizer: LUIS
Expected: Cheese, Ingredients
    When this rule is added, no other rules are modified. If the bot arrives at a state where it has Meat/Bread and still needs cheese/ingredients, then the new rule will override the rules for just cheese or ingredients because it is more specific. Knowing that this rule is to be added could be guided by analytics that indicate that people frequently end up in this state.
    To create a bot implementing such rules, other tasks may be added as well. For example, a greeting task may be added. To modify the bot rules, the developer could start by adding in a greeting and asking for the user's name. In the example below, when the bot is started, either the generic welcome is provider or, if there was a name, the more specific welcome is provided. This is a simple example of subsumption/specificity, i.e. states where there is a Name are more specific than states where there is not a Name, so the specific greeting would be provided when Name is present in the memory.
Name: Greeting
Intent: StartEvent
Selector:
Trigger:
Messages: ["Welcome to the sandwich bot!
Trigger: Intent('order') && Unbound("Name")
Messages: ["Please enter your name.
Recognizer: String
Expected: Name
Trigger: Intent('order') && Bound("Name")
Messages: ["Welcome to the sandwich bot {Name})!
User Interface Like applications and websites, bots have a user interface, but it is made up of dialogs rather than screens. Dialogs help to preserve the place within a conversation, prompt users when needed, and execute input validation. The user interfaces are useful form managing multi-turn conversations and simple form-based collections of information to accomplish activities such as booking a hotel. Dialogs enable the bot developer to logically separate areas of bot functionality and to guide conversational flow. Dialogs may or may not have graphical interfaces. The user interface for a bot may contain buttons, text, and other elements, or be entirely speech-based. Dialogs may also contain actions to perform tasks such as invoking other dialogs or processing other input. Typically, the dialog is part of a dialog stack, and the dialog that is on top of the stack is in control of the conversation. Every new message sent by a user will be subjected to processing by that dialog until it either closes or redirects to another dialog. When a dialog closes, it is removed from the dialog stack, and the previous dialog in the stack assumes control of the conversation.

The user interfaces described herein provide mechanisms to the developer for automatically building the triggers. The user interface may also include other building blocks like a confirmation where the appropriate conditions are automatically added. Also, the conditions for more advanced cases may be explicitly edited (e.g., add a constraint on the date being near Valentine's day).

Conversation Learner provides a user interface that may be extended with subsumption in a sample embodiment. The screen shots in FIGS. 3-8 show how some of the concepts described herein are exposed in Conversation Learner and what kind of changes would be made to implement the subsumption features. For example, the screen shot 300 in FIG. 3 shows how required entities 310 and blocking entities 320 are filled in automatically via references in the template.

The Conversation Learner UI also has the typical pattern of allowing both a centralized edit experience for a given resource type like an entity or action while also allowing simple creation of the entity or action in the flow. An example of this is creating an entity or action using user interfaces of the type illustrated in FIG. 4 and FIG. 5 for creating an entity and FIG. 6 and FIG. 7 for creating an action in the context of the above sandwich example. The flow of the bot response could then be generated using a dialog interface 800 of the type illustrated in FIG. 8.

The platform for building a dialog-state specific contextual language understanding system for an application described herein thus enables developers to create expressions for triggers and to utilize a parser for parsing the expression language to identify the triggers. A set of memory predicates may be used to check received values. A set of events may be provided that clearly define the scope and parameters of the events. A memory maintains the conversational state, and subsumption logic is implemented to determine for each conversational state what rules apply. The appropriate selectors then select the appropriate rule to drive the bot's dialog. Alternatively, user sentiment could be detected whereby a rule could be repeated until the rule is satisfied or the user is frustrated by the rule. This could be done by adding !Emotion(Frustrated) to the trigger condition.

For the purposes of this description, it is assumed that the platform for designing and building bots including subsumption logic features as described herein includes a portal for a bot provisioning service for creating, selecting and provisioning autonomous software agents (bots) for sharing of the type described, for example, in U.S. Patent Application Publication No. 2017/0288942. It is also assumed that the platform for designing and building bots may implement simple dialogs or more complex dialogs of the type described, for example, by U.S. Patent Application Publication No. 2018/0090141. It is further assumed that the platform for designing and building bots may implement a dialog-state specific multi-turn contextual language understanding system of the type described, for example, in U.S. Pat. No. 9,996,532. Such systems collectively provide software development toolkits that enable users to create bots having dialogs desired for particular applications and to provision those bots for the particular applications for access by customers. As noted above and further below, the dialogs in the embodiments described herein are developed using the subsumption logic techniques described herein.

Figure 9:
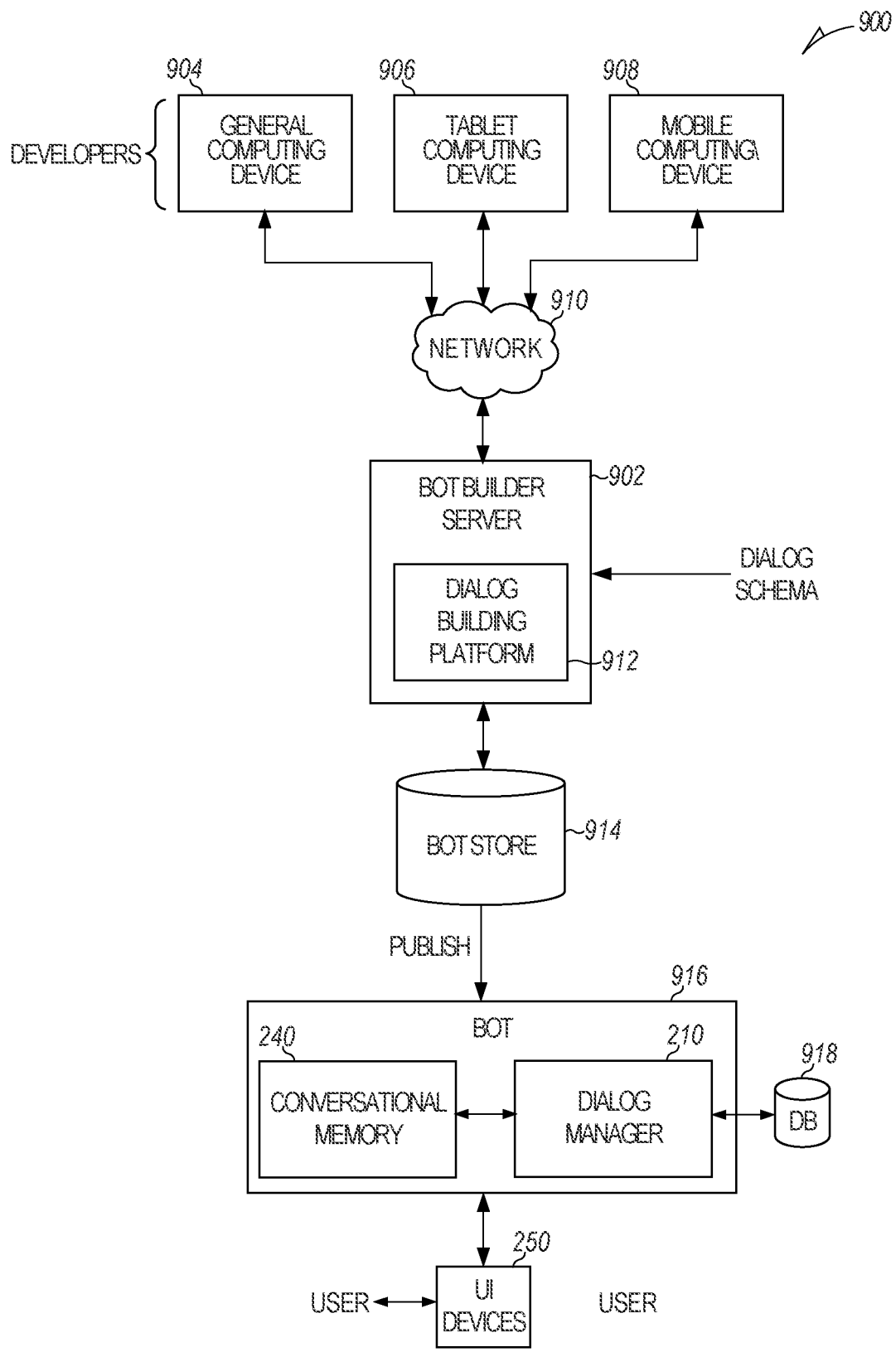
FIG. 9 illustrates a simplified block diagram of a computing system including a bot building server platform for designing and publishing bots in a sample embodiment.

FIG. 9 is a simplified block diagram of a computing system 900 including a bot building server platform 902 for designing and publishing bots in a sample embodiment. As illustrated in FIG. 9, developers may user their computing devices, such as general computing device 904, tablet computing device 906, and/or mobile computing device 908, to access the bot building server platform 902 via network 910, which may be the Internet, a local network, a wide area network, and the like. Bot building server platform 902 includes resources of the type described in U.S. Patent Application Publication No. 2017/0288942 and U.S. Patent Application Publication No. 2018/0090141 to enable the developers to build bots for different communications applications. In sample embodiments, the bot building server platform 902 includes dialog building platform 912 for creating dialogs for respective applications implementing the created bot. In sample embodiments, the dialog building platform 912 uses dialog schema provided by the developer.

The dialog building platform server 902 provides the dialog schema to dialog building platform 912 to create the desired dialogs for the bots being created by the developers using techniques such as those described in U.S. Patent Application Publication No. 2018/0090141. The created bots are stored in bot store 914 for publishing to different bot communication channels for interaction with users. For example, the communication channels for the bot dialog may include directory services, a web portal, mailbox services, instant message stores, social networking services, virtual assistants, and other services that may implement dialogs via bots. The bot 916 so created and published may be a bot of the type described above with respect to FIG. 2. As described above, the bot 916 may include a dialog manager 210 and a conversational memory 240 for implementing the subsumption rules and techniques as described herein for conversing with users via the UI devices 250. The dialog manager 210 may interact with a database 918 for predicates of the conversational state that have aspects that are external to the conversational state. Content provided by users when interacting with the bot 916 is stored in the conversational memory 240 for processing by the dialog manager 210 as described herein. By way of example, the dialog building platform 912 may be implemented in a general computing device, and the bot building platform server 902 is configured to implement the dialog building platform 912 via the network 910 as illustrated in FIG. 9.

Figure 10:
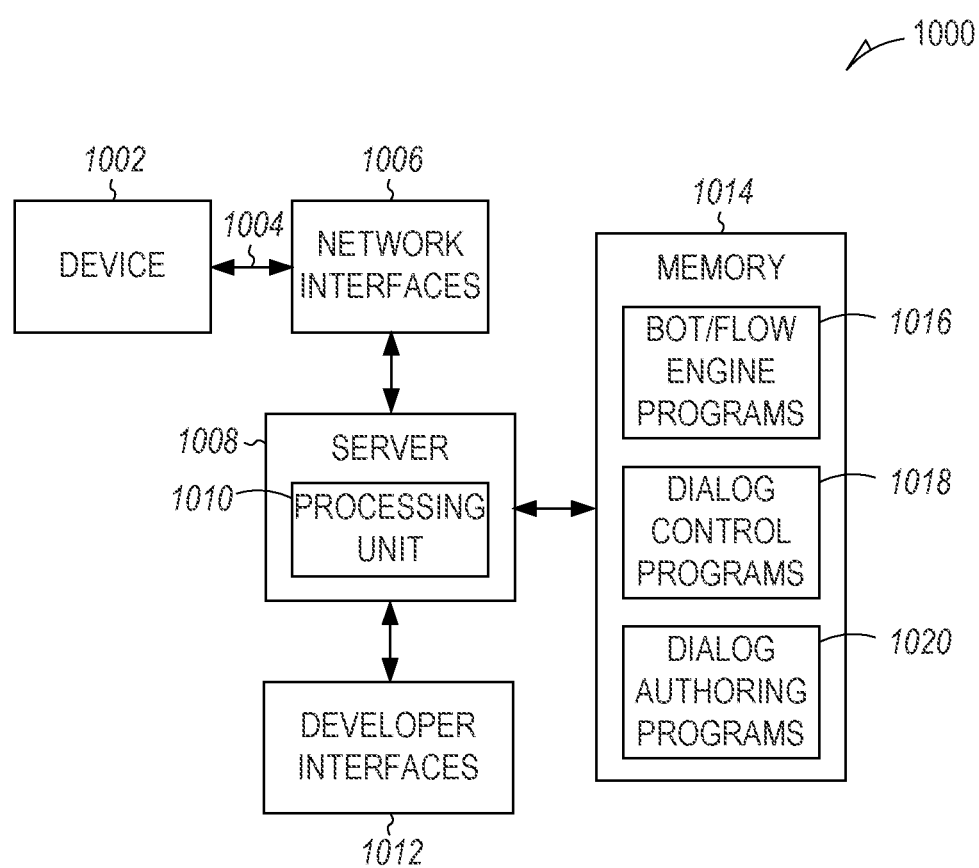
FIG. 10 illustrates a simplified block diagram of a sample apparatus for implementing bots generated in a sample embodiment.

FIG. 10 illustrates a simplified block diagram of a sample apparatus 300 for implementing bots generated in a sample embodiment. The functions described herein may be implemented on an apparatus such as apparatus 1000. Apparatus 1000 may be implemented to communicate over a network, such as the Internet, with devices 1002 to provide conversational input and output to users of the devices 1002. For example, apparatus 1000 may be implemented to communicate with devices 1002 such as UI devices 250 illustrated in FIG. 2 and FIG. 9.

In sample embodiments, apparatus 1000 may include a server 1008 having processing unit 1010, a memory 1014, network interfaces 1006 to other networks, and developer interfaces 1012. The network interfaces 1006 allow communication between apparatus 1000 and device 1002 through, for example, the Internet and a wireless system in which device 1002 is operating. The network interfaces 1006 also allow apparatus 1000 to communicate with other systems used in implementations such as language processing programs. On the other hand, developer interfaces 1012 allow a developer/dialog author to configure/install one or more bots on apparatus 1000. The authoring of the dialogs may be done remotely or at apparatus 1000.

Memory 1014 may be implemented as any type of computer readable storage media, including non-volatile and volatile memory. Memory 1014 is shown as including bot flow engine control programs 1016, dialog control programs 1018, and dialog authoring programs 1020. Server 1008 and processing unit 1010 may comprise one or more processors, or other control circuitry, or any combination of processors and control circuitry that provide overall control of apparatus 1000 according to the disclosed embodiments.

Bot/flow engine control programs 1016 and dialog control programs 1018 may be executed by processing unit 1010 to control apparatus 1000 to perform functions for providing bot conversations using universal schema as described herein. Dialog authoring programs 1020 may be executed by processing unit 1010 to control apparatus 1000 to perform functions that allow a user to author dialogs implementing the processes described herein. In alternative implementations, dialog authoring programs 1020 may be implemented on another device and bots and/or dialogs may be installed on apparatus 1000 once authored. Dialog control programs 1018 also may be executed by processing unit 1010 to control apparatus 1000 to manage the dialogs presented to the bot channels during use.

Apparatus 1000 is shown as including server 1008 as a single server. However, server 1008 may be representative of server functions or server systems provided by one or more servers or computing devices that may be co-located or geographically dispersed to implement apparatus 1000. Portions of memory 1014, bot/flow engine control programs 1016, dialog control programs 1018, and dialog authoring programs 1020 may also be co-located or geographically dispersed. The term server as used in this disclosure is used generally to include any computing devices or communications equipment that may be implemented to provide bots according to the disclosed embodiments.

The example embodiments disclosed herein may be described in the general context of processor-executable code or instructions stored on memory that may comprise one or more computer readable storage media (e.g., tangible non-transitory computer-readable storage media such as memory 1016). As should be readily understood, the terms "computer-readable storage media" or "non-transitory computer-readable media" include the media for storing of data, code and program instructions, such as memory 1016, and do not include portions of the media for storing transitory propagated or modulated data communication signals.

Figure 11:
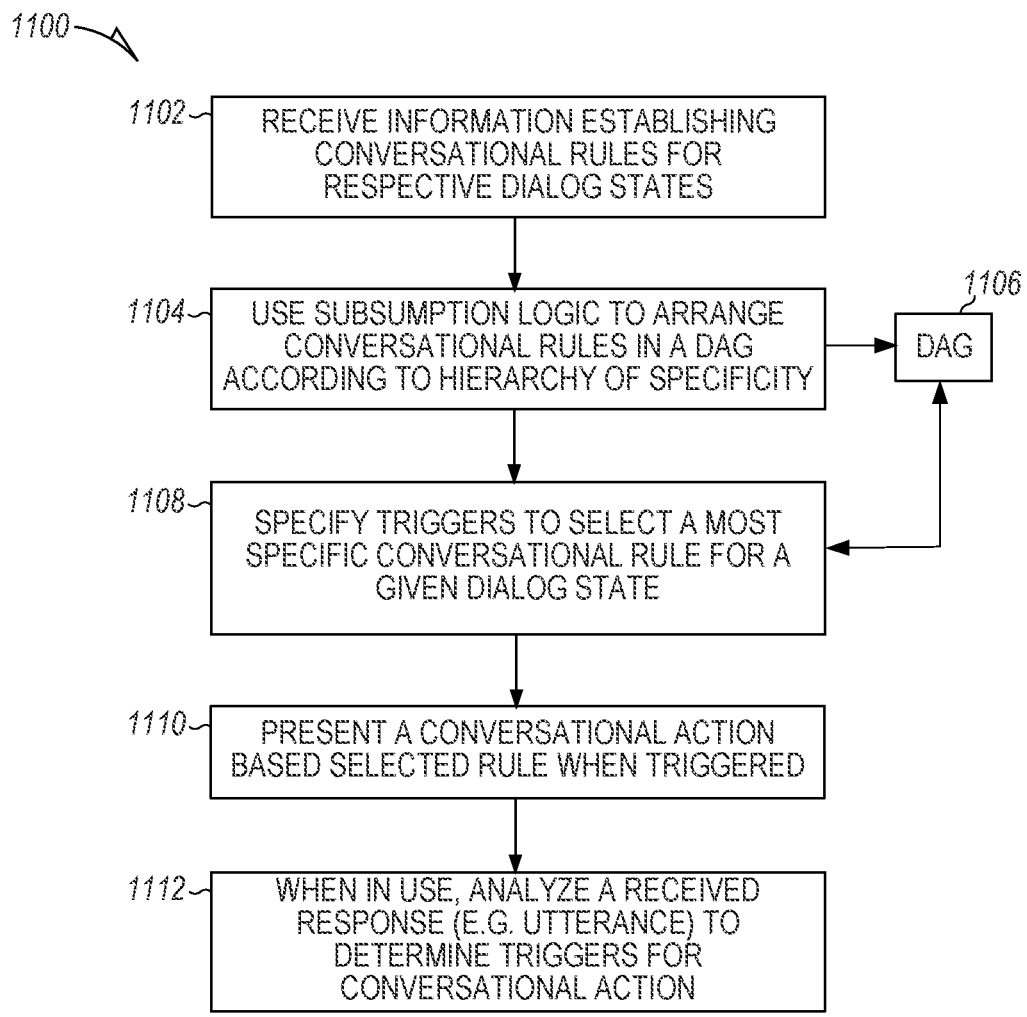
FIG. 11 illustrates a method for building a dialog-state specific contextual language understanding system for an application in a sample embodiment.

FIG. 11 illustrates a method 1100 for building a dialog-state specific contextual language understanding system for an application in a sample embodiment. As illustrated, method 1100 starts at 1102 by receiving information from a bot developer or other user establishing rules identifying the conversational dialog to present in respective dialog states. Subsumption logic is applied at 1104 to arrange the rules into a directed acyclic graph (DAG) 1106 according to a hierarchy of specificity whereby more specific rules are preferred over less specific rules to support a many path conversational dialog. Also, objects identified in conversational data from a user may be arranged into the directed acyclic graph whereby more specific rules and objects are selected over more general rules and objects for use in a conversational dialog.

As noted with respect to FIG. 9, a bot 916 created using the dialog building platform 912 may be published to several conversational channels for interacting with users. During development, the developer or other user may further specify at 1108 triggers that, when activated, cause a more specific conversational rule to be selected from DAG 1106 over a less specific conversation rule for a dialog state of the conversational dialog. The resulting bot is further designed so that, when triggered, a conversational action for the application based on the selected most specific rule for the dialog state is performed at 1110. For example, as noted above, the conversational action may include presenting a message, presenting a conversational prompt requesting additional information, modifying memory, and calling an application program interface.

Once published and in use, the resulting dialog-state specific contextual language understanding system may be used to analyze a received utterance or other response from a user of the dialog-state specific contextual language understanding system at 1112 to determine triggers for triggering conversational prompts for the application. For example, rules may be identified where a Boolean trigger expression is true by evaluating predicate expressions against the dialog state and combining the rules using Boolean logic. The conversational data continues to be collected and updated until the given dialog is completed or another dialog is invoked.

Each bot created using the techniques described herein may incorporate natural language understanding and voice features into the dialog messaging using, for example, a dialog-state specific multi-turn contextual understanding system of the type described, for example, in U.S. Pat. No. 9,996,532. Also, to establish user intent, the bets may be designed to call other services to provide natural language processing using machine learning techniques to identify responses that are most statistically similar when a particular response is ambiguous. Similarly, the bots may process the responses by calling, for example, a language understanding service such as LUIS to establish the intent and/or context of the user's response. In other embodiments, the natural language processing and/or language understanding service may be implemented in the bot. Such processing may be performed on the response data prior to storage in the personal profile for the responding user.

In summary, the subsumption approach described herein enables bot developers a way to specify desired behavior in an easy to understand and controllable way while still allowing machine learning to handle less specified situations. General rules can be defined and overridden in more specific situations. The order in which rules are added to a dialog management system does not matter as the subsumption logic will automatically arrange the rules by specificity. By providing the flexibility of logic and being able to define predicates and their subsumption relationships, bot developers can easily incorporate domain specific knowledge to extend conversational system rules using specificity to add additional rules to the conversational dialog without modifying established rules. Also, the subsumption approach described herein enhances machine learning applications by enabling machine learning applications to apply subsumption rules to the conversational action to limit a number of actions possible in a given dialog state.

System Configuration

Techniques described herein may be used with one or more of the computer systems described herein and/or with one or more other systems. For example, the various procedures described herein may be implemented with hardware or software, or a combination of both. For example, the processor, memory, storage, output device(s), input device(s), and/or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

Figure 12:
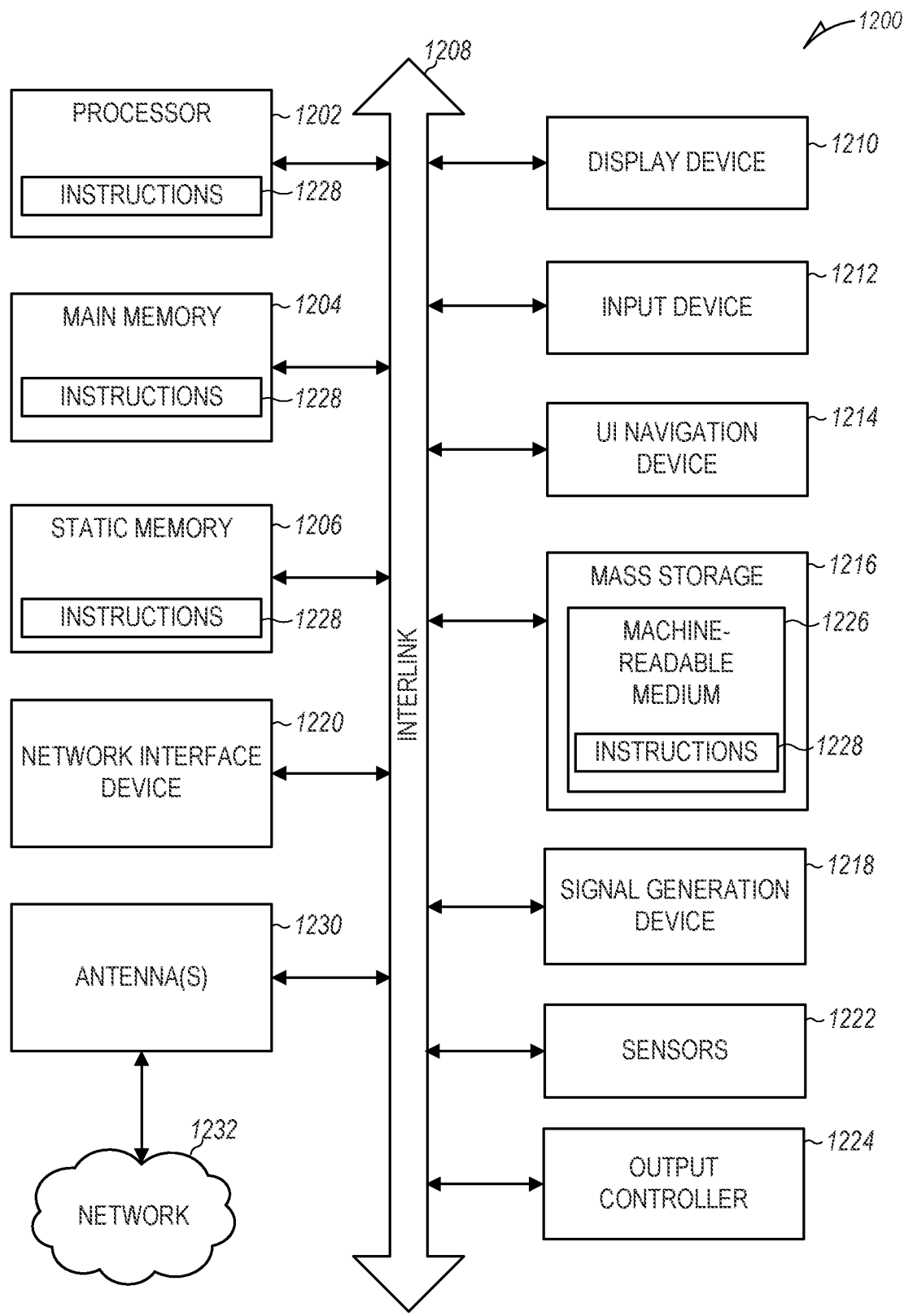
FIG. 12 illustrates a block diagram of an example of a machine upon which one or more embodiments may be implemented.

FIG. 12 illustrates a block diagram of an example of a machine 1200 upon which one or more embodiments may be implemented. In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. In sample embodiments, the machine 1200 as well as the user devices 302 (FIG. 3) may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 1200 may serve as a workstation, a front-end server, or a back-end server of a communication system. Machine 1200 may implement the methods described herein by running the software used to implement the bots created as described herein. Further, while only a single machine 1200 is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass a tangible hardware and/or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1200 may include a hardware processor 1202 (e.g., a central processing unit (CPU), a graphics processing unit (GPU), a hardware processor core, or any combination thereof), a main memory 1204 and a static memory 1206, some or all of which may communicate with each other via an interlink (e.g., bus) 1208. The machine 1200 may further include a display unit 1210 (shown as a video display), an alphanumeric input device 1212 (e.g., a keyboard), and a user interface (UI) navigation device 1214 (e.g., a mouse). In an example, the display unit 1210, input device 1212 and UI navigation device 1214 may be a touch screen display. The machine 1200 may additionally include a mass storage device (e.g., drive unit) 1216, a signal generation device 1218 (e.g., a speaker), a network interface device 1220, and one or more sensors 1222. Example sensors 1222 include one or more of a global positioning system (GPS) sensor, compass, accelerometer, temperature, light, camera, video camera, sensors of physical states or positions, pressure sensors, fingerprint sensors, retina scanners, or other sensors. The machine 1200 may include an output controller 1224, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.).

The mass storage device 1216 may include a machine readable medium 1226 on which is stored one or more sets of data structures or instructions 1228 (e.g., software) embodying or utilized by any one or more of the techniques or functions described herein. The instructions 1228 may also reside, completely or at least partially, within the main memory 1204, within static memory 1206, or within the hardware processor 1202 during execution thereof by the machine 1200. In an example, one or any combination of the hardware processor 1202, the main memory 1204, the static memory 1206, or the mass storage device 1216 may constitute machine readable media.

While the machine readable medium 1226 is illustrated as a single medium, the term "machine readable medium" may include a single medium or multiple media (e.g., a centralized or distributed database, and/or associated caches and servers) configured to store the one or more instructions 1228. The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks: magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 1228 may further be transmitted or received over communications network 1232 using a transmission medium via the network interface device 1220. The machine 1200 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1220 may include one or more physical jacks (e.g., Ethernet, coaxial, or phone jacks) or one or more antennas 1230 to connect to the communications network 1232. In an example, the network interface device 1220 may include a plurality of antennas 1230 to wirelessly communicate using at least one of single-input multiple-output (SIMO), multiple-input multiple-output (MIMO), or multiple-input single-output (MISO) techniques. In some examples, the network interface device 1220 may wirelessly communicate using Multiple User MIMO techniques.

Certain embodiments are described herein as numbered examples 1, 2, 3, etc. These numbered examples are provided as examples only and do not limit the subject technology.

Example 1 is a computer-implemented method of building a dialog-state specific contextual language understanding system for an application, the method comprising receiving information establishing rules identifying the conversational dialog to present in respective dialog states; using subsumption logic to arrange the rules into a directed acyclic graph according to a hierarchy of specificity whereby more specific rules are preferred over less specific rules to support a many path conversational dialog; establishing triggers that, when true in a dialog state of the conversational dialog, identify possible rules that are filtered to the most specific rules using the DAG: and performing a conversational action for the application based on selecting one of the most specific triggered rules for the dialog state, the conversational action including at least one of presenting a message, presenting a conversational prompt requesting additional information, modifying memory, and calling an application program interface.

Example 2 is a method as in Example 1 further comprising using specificity to add additional rules to the conversational dialog without modifying established rules.

Example 3 is a method as in any preceding Example further comprising implementing the dialog-state specific contextual language understanding system in the application and analyzing a received utterance from a user of the dialog-state specific contextual language understanding system to determine triggers for triggering conversational prompts for the application.

Example 4 is a method as in any preceding Example further comprising identifying rules where a Boolean trigger expression is true by evaluating predicate expressions against the dialog state and combining the rules using Boolean logic.

Example 5 is a method as in any preceding Example further comprising arranging objects identified in conversational data from a user into the directed acyclic graph whereby more specific rules and objects are selected over more general rules and objects for use in a conversational dialog.

Example 6 is a method as in any preceding Example wherein the application is a machine learning application further comprising the machine learning application learning to select a conversational action limited to a set of most specific triggered rules found in the directed acyclic graph that are true in the current dialog state rather than learning how to select from all possible rules.

Example 7 is a method as in any preceding Example further comprising applying subsumption rules to the conversational action to limit a number of actions possible in a given dialog state.

Example 8 is a system with a platform for building a dialog-state specific contextual language understanding system for an application, the system comprising at least one processor and a memory for storing and encoding computer executable instructions that, when executed by the at least one processor, is operative to receive information establishing rules identifying the conversational dialog to present in respective dialog states: use subsumption logic to arrange the rules into a directed acyclic graph according to a hierarchy of specificity whereby more specific rules are preferred over less specific rules to support a many path conversational dialog: establish triggers that, when true in a dialog state of the conversational dialog, identify possible rules that are filtered to the most specific rules using the DAG; and perform a conversational action for the application based on selecting one of the most specific triggered rules for the dialog state, the conversational action including at least one of presenting a message, presenting a conversational prompt requesting additional information, modifying memory, and calling an application program interface.

Example 9 is a system as in Example 8 wherein the memory further includes instructions that when executed by the at least one processor enable a user of the system to add more specific rules to the conversational dialog without modifying established rules.

Example 10 is a system as in Examples 8 and 9 wherein the dialog-state specific contextual language understanding system is implemented by the application and the memory further includes instructions that when executed by the at least one processor analyze a received utterance from a user of the dialog-state specific contextual language understanding system to determine triggers for triggering conversational prompts for the application.

Example 11 is a system as in Examples 8-10 wherein the memory further includes instructions that when executed by the at least one processor identifies rules where a Boolean trigger expression is true by evaluating predicate expressions against the dialog state and combining the rules using Boolean logic.

Example 12 is a system as in Examples 8-11 wherein the memory further includes instructions that when executed by the at least one processor arranges objects identified in conversational data from a user into the directed acyclic graph whereby more specific rules and objects are selected over more general rules and objects for use in a conversational dialog.

Example 13 is a system as in Examples 8-12 wherein the application is a machine learning application that learns to select a conversational action limited to a set of most specific triggered rules found in the directed acyclic graph that are true in the current dialog state rather than learning how to select from all possible rules.

Example 14 is a system as in Examples 8-13 wherein the memory further includes instructions that when executed by the at least one processor applies subsumption rules to the conversational action to limit a number of actions possible in a given dialog state.

Example 15 is a non-transitory machine-readable medium having instructions stored thereon that when executed by one or more processors cause the one or more processors to implement a method of building a dialog-state specific contextual language understanding system for an application, the method including receiving information establishing rules identifying the conversational dialog to present in respective dialog states: using subsumption logic to arrange the rules into a directed acyclic graph according to a hierarchy of specificity whereby more specific rules are preferred over less specific rules to support a many path conversational dialog: establishing triggers that, when true in a dialog state of the conversational dialog, identify possible rules that are filtered to the most specific rules using the DAG; and performing a conversational action for the application based on selecting one of the most specific triggered rules for the dialog state, the conversational action including at least one of presenting a message, presenting a conversational prompt requesting additional information, modifying memory, and calling an application program interface.

Example 16 is a medium as in Example 15 wherein the instructions include further instructions that when executed by the one or more processors enables a user of the dialog-state specific contextual language understanding system to add more specific rules to the conversational dialog without modifying established rules.

Example 17 is a medium as in Examples 15 and 16 wherein the dialog-state specific contextual language understanding system is implemented by the application and the instructions further include instructions that when executed by the one or more processors analyze a received utterance from a user of the dialog-state specific contextual language understanding system to determine triggers for triggering conversational prompts for the application.

Example 18 is a medium as in Examples 15-17 wherein the instructions further include instructions that when executed by the one or more processors identify rules where a Boolean trigger expression is true by evaluating predicate expressions against the dialog state and combining the rules using Boolean logic.

Example 19 is a medium as in Examples 15-18 wherein the instructions further include instructions that when executed by the one or more processors arrange objects identified in conversational data from a user into the directed acyclic graph whereby more specific rules and objects are selected over more general rules and objects for use in a conversational dialog.

Example 20 is a medium as in Examples 15-19 wherein the application is a machine learning application and the instructions further include instructions that when executed by the one or more processors select a conversational action limited to a set of most specific triggered conversational rules found in the directed acyclic graph that are true in the current dialog state rather than learning how to select from all possible rules in response to a request for a rule-based dialog from the machine learning application and apply subsumption rules to the conversational action to limit a number of actions possible in a given dialog state.

Alternative implementations of the system for building a dialog-state specific contextual language understanding system for an application as described herein are contemplated. For example, the system described herein may be implemented within or in association with a number of online products and services besides a bot building platform. Such additional online products and services include, for example, a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transaction application, a device control application, a web interface application, an exchange application, a calendaring application, a chat application, a voice assist application, and the like. Thus, the system for building a dialog-state specific contextual language understanding system for an application as described herein is not to be limited to the system described in specific examples. These and other implementations are included within the context of the disclosed embodiments as set forth in the following claims.

In the above Detailed Description, various features may be grouped together to streamline the disclosure. However, the claims may not set forth every feature disclosed herein as embodiments may feature a subset of the features. Further, embodiments may include fewer features than those disclosed in a particular example. Also, although the subject matter has been described in language specific to structural features and/or methodological acts, it is to be understood that the subject matter defined in the appended claims is not necessarily limited to the specific embodiments, features, or acts described above. Rather, the specific embodiments, features, and acts described above are disclosed as example forms of implementing the claims. Thus, the following claims are hereby incorporated into the Detailed Description, with a claim standing on its own as a separate embodiment.

What is claimed is:

1. A method of building a dialog-state specific contextual language understanding system for an application, the method comprising:
receiving information establishing rules identifying the conversational dialog to present in respective dialog states, the rules providing a limited set of choices given the dialog state;
using subsumption logic to arrange the rules that include conditions to apply to the dialog states into a directed acyclic graph that include a vertex for each rule arranged according to a hierarchy of specificity whereby more specific rules that include conditions that fewer dialog states satisfy than less specific rules subsume less specific rules and are preferred over the less specific rules to support a many path conversational dialog;
establishing trigger conditions that, when true in a dialog state, identify possible rules that are filtered to the most specific rules using the directed acyclic graph; and
performing a conversational action for the application based on selecting one of the most specific rules for the dialog state, the conversational action including at least one of presenting a message, presenting a conversational prompt requesting additional information, and modifying memory to modify a state of the conversational dialog.

2. A method as in claim 1, further comprising using specificity to add additional rules to the conversational dialog without modifying established rules.

3. A method as in claim 1, further comprising implementing the dialog-state specific contextual language understanding system in the application and analyzing a received utterance from a user of the dialog-state specific contextual language understanding system to determine trigger conditions for triggering conversational prompts for the application.

4. A method as in claim 3, further comprising identifying rules where a Boolean trigger expression is true by evaluating predicate expressions against the dialog state and combining the rules using Boolean logic.

5. A method as in claim 1, further comprising arranging objects identified in conversational data from a user into the directed acyclic graph whereby more specific rules are selected over more general rules for use in a conversational dialog.

6. A method as in claim 1, wherein the application is a machine learning application further comprising the machine learning application learning to select a conversational action limited to a set of most specific triggered rules found in the directed acyclic graph that are true in the current dialog state rather than learning how to select from all possible rules.

7. A method as in claim 6, further comprising applying subsumption logic to the conversational action to limit a number of actions possible in a given dialog state.

8. A system with a platform for building a dialog-state specific contextual language understanding system for an application, the system comprising:
at least one processor; and
a memory for storing and encoding computer executable instructions that, when executed by the at least one processor, is operative to:
receive information establishing rules identifying the conversational dialog to present in respective dialog states, the rules providing a limited set of choices given the dialog state;
use subsumption logic to arrange the rules that include conditions to apply to the dialog states into a directed acyclic graph that include a vertex for each rule arranged according to a hierarchy of specificity whereby more specific rules that include conditions that fewer dialog states satisfy than less specific rules subsume less specific rules and are preferred over the less specific rules to support a many path conversational dialog;
establish trigger conditions that, when true in a dialog state, identify possible rules that are filtered to the most specific rules using the directed acyclic graph; and
perform a conversational action for the application based on selecting one of the most specific rules for the dialog state, the conversational action including at least one of presenting a message, presenting a conversational prompt requesting additional information, and modifying memory to modify a state of the conversational dialog.

9. A system as in claim 8, wherein the memory further includes instructions that when executed by the at least one processor enable a user of the system to add more specific rules to the conversational dialog without modifying established rules.

10. A system as in claim 8, wherein the dialog-state specific contextual language understanding system is implemented by the application and the memory further includes instructions that when executed by the at least one processor analyze a received utterance from a user of the dialog-state specific contextual language understanding system to determine trigger conditions for triggering conversational prompts for the application.

11. A system as in claim 10, wherein the memory further includes instructions that when executed by the at least one processor identifies rules where a Boolean trigger expression is true by evaluating predicate expressions against the dialog state and combining the rules using Boolean logic.

12. A system as in claim 8, wherein the memory further includes instructions that when executed by the at least one processor arranges objects identified in conversational data from a user into the directed acyclic graph whereby more specific rules and objects are selected over more general rules and objects for use in a conversational dialog.

13. A system as in claim 8, wherein the application is a machine learning application that learns to select a conversational action limited a set of most specific triggered rules found in the directed acyclic graph that are true in the current dialog state rather than learning how to select from all possible rules.

14. A system as in claim 13, wherein the memory further includes instructions that when executed by the at least one processor applies subsumption logic to the conversational action to limit a number of actions possible in a given dialog state.

15. A non-transitory machine-readable medium having instructions stored thereon that when executed by one or more processors cause the one or more processors to implement a method of building a dialog-state specific contextual language understanding system for an application, the method including:
- receiving information establishing rules identifying the conversational dialog to present in respective dialog states, the rules providing a limited set of choices given the dialog state;
- using subsumption logic to arrange the rules that include conditions to apply to the dialog states into a directed acyclic graph that include a vertex for each rule arranged according to a hierarchy of specificity whereby more specific rules that include conditions that fewer dialog states satisfy than less specific rules subsume less specific rules and are preferred over the less specific rules to support a many path conversational dialog;
- establishing trigger conditions that, when true in a dialog state, identify possible rules that are filtered to the most specific rules using the directed acyclic graph; and
- performing a conversational action for the application based on selecting one of the most specific rules for the dialog state, the conversational action including at least one of presenting a message, presenting a conversational prompt requesting additional information, and modifying memory to modify a state of the conversational dialog.

16. A medium as in claim 15, wherein the instructions include further instructions that when executed by the one or more processors enables a user of the dialog-state specific contextual language understanding system to add more specific conversational rules to the conversational dialog without modifying established conversational rules.

17. A medium as in claim 15, wherein the dialog-state specific contextual language understanding system is implemented by the application and the instructions further include instructions that when executed by the one or more processors analyze a received utterance from a user of the dialog-state specific contextual language understanding system to determine trigger conditions for triggering conversational prompts for the application.

18. A medium as in claim 17, wherein the instructions further include instructions that when executed by the one or more processors identify rules where a Boolean trigger expression is true by evaluating predicate expressions against the dialog state and combining the rules using Boolean logic.

19. A medium as in claim 15, wherein the instructions further include instructions that when executed by the one or more processors arrange objects identified in conversational data from a user into the directed acyclic graph whereby more specific rules and objects are selected over more general rules and objects for use in a conversational dialog.

20. A medium as in claim 15, wherein the application is a machine learning application and the instructions further include instructions that when executed by the one or more processors select a conversational action limited to a set of most specific triggered rules found in the directed acyclic graph that are true in the current dialog state rather than learning how to select from all possible rules in response to a request for a rule-based dialog from the machine learning application and apply subsumption logic to the conversational action to limit a number of actions possible in a given dialog state.

* * * * *